(12) United States Patent
Chui et al.

(10) Patent No.: US 7,162,080 B2
(45) Date of Patent: Jan. 9, 2007

(54) GRAPHIC IMAGE RE-ENCODING AND DISTRIBUTION SYSTEM AND METHOD

(75) Inventors: Charles K. Chui, Menlo Park, CA (US); Haishan Wang, Mountain View, CA (US)

(73) Assignee: Zoran Corporation, Sunnyvale, CA (US)

( * ) Notice: Subject to any disclaimer, the term of this patent is extended or adjusted under 35 U.S.C. 154(b) by 686 days.

(21) Appl. No.: 09/952,443

(22) Filed: Sep. 13, 2001

(65) Prior Publication Data
US 2002/0159632 A1 Oct. 31, 2002

Related U.S. Application Data

(60) Provisional application No. 60/271,171, filed on Feb. 23, 2001.

(51) Int. Cl.
*G06K 9/00* (2006.01)

(52) U.S. Cl. .................. 382/168; 382/239; 382/244

(58) Field of Classification Search ........ 382/232–253; 345/473, 418–587; 358/1.9, 1.17, 426.01–426.02
See application file for complete search history.

(56) References Cited

U.S. PATENT DOCUMENTS

| | | | |
|---|---|---|---|
| 5,479,587 A | 12/1995 | Campbell et al. | 358/1.17 |
| 5,838,821 A * | 11/1998 | Matsubara et al. | 382/190 |
| 5,838,823 A * | 11/1998 | Ancessi | 382/232 |
| 5,875,270 A * | 2/1999 | Nakamura | 382/232 |
| 5,892,847 A | 4/1999 | Johnson | |
| 6,141,446 A * | 10/2000 | Boliek et al. | 382/233 |
| 6,182,127 B1 * | 1/2001 | Cronin et al. | 709/219 |
| 6,289,118 B1 * | 9/2001 | Cossey | 382/162 |
| 6,347,157 B1 * | 2/2002 | Chui | 382/240 |
| 6,559,983 B1 * | 5/2003 | Toyoda et al. | 359/23 |
| 6,657,631 B1 * | 12/2003 | Schinnerer | 345/502 |
| 6,710,775 B1 * | 3/2004 | Tulman | 345/473 |
| 6,731,814 B1 | 5/2004 | Zeck et al. | 382/239 |
| 6,804,401 B1 | 10/2004 | Nelson et al. | 382/239 |
| 6,842,539 B1 * | 1/2005 | Le Maguet | 382/236 |
| 6,897,858 B1 * | 5/2005 | Hashimoto et al. | 345/419 |
| 6,941,019 B1 * | 9/2005 | Mitchell et al. | 382/232 |

FOREIGN PATENT DOCUMENTS

WO PCT/US02/05062 2/2002

* cited by examiner

*Primary Examiner*—Kanjibhai Patel
*Assistant Examiner*—Ishrat Sherali
(74) *Attorney, Agent, or Firm*—Morgan, Lewis & Bockius LLP

(57) ABSTRACT

An image file, which typically represents a palette-based image that has been encoded using a first predefined run-length based encoding method, is decoded to produce an image data array. The image data array is divided into blocks; either all the blocks or a majority of the blocks have a predefined fixed size. At least some of the blocks of the image are processed to produce a corresponding re-encoded block. In particular, each such block is processed by applying a plurality of distinct encodings to the block to produce an equal plurality of distinct re-encoded block versions. One of the plurality of distinct re-encoded block versions is selected in accordance with predefined selection criteria for use as the re-encoded block. Each re-encoded block is stored in a distinct data structure, such as a file. In a client-server network, when a low bandwidth client device requests an image file, just the block image files needed by the client device are downloaded, thereby greatly reducing the request to display delay.

71 Claims, 14 Drawing Sheets

Image Block File data structure

NQS: Divide Block into Subblocks

```
                                                    ┌─304
Output MaxBit(h,w,k-1):  / preferred implementation /

Set b = MaxBit(h,w,k-1);
If b=0   {Output B "0" bits}
Else    {Output B-b "0" bits followed by a "1" bit};
```

```
Set repeat-times = 0;
repeat:
 {
  input 1 bit;
  If input bit =1  {
      MaxBit(i,j,k-1) = B - repeat-times;
      Add (i,j,k-1) block to LB;
      Stop repeating;
      };
  If repeat-times = B  {
      MaxBit(i,j,k-1) = 0;
      Stop repeating;
      }
  repeat-times = repeat-times + 1;
 }.
```

FIG. 10

Re-indexed Run Length Encoding Method 174

Image Block File data structure

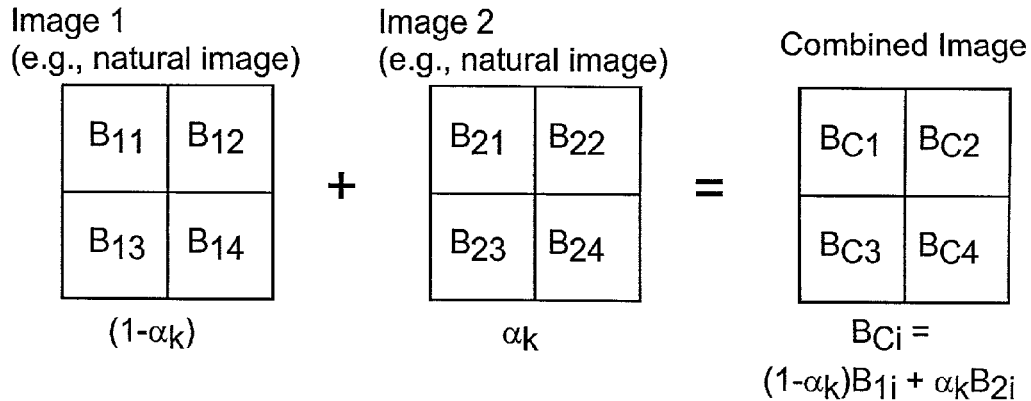

FIG. 18

Fade In Procedure / Client Device

Set $\alpha = 0$
Repeat once every X (e.g., 100) milliseconds until $\alpha >=$ Limit
{
Generate combined blocks $B_{Ci}$ by combining
Blocks B1i with B2i using $\alpha$
Display combined block images
If $\alpha <$ Limit (e.g., $\alpha_k$ )
   {increase $\alpha$ by $\beta\alpha_k$ (e.g., $\beta = 0.05$) }
}

FIG. 19

Fade Out Procedure / Client Device

Set $\alpha =$ Limit
Repeat once every X (e.g., 100) milliseconds until $\alpha =< 0$
{
Generate combined blocks $B_{Ci}$ by combining
Blocks B1i with B2i using $\alpha$
Display combined block images
If $\alpha >$ Limit (e.g., $\alpha_k$ )
   {decrease $\alpha$ by $\beta\alpha_k$ (e.g., $\beta = 0.05$) }
}

FIG. 20

GRAPHIC IMAGE RE-ENCODING AND DISTRIBUTION SYSTEM AND METHOD

This application claims priority on U.S. provisional patent application 60/271,171, filed Feb. 23, 2001, which is hereby incorporated by reference in its entirety.

The present invention relates generally to the processing, compression, communication, storage and display of images in computer systems, personal digital assistants, wireless devices capable of displaying images, and other devices, and particularly to an image compression, decompression and management system and method in which small portions of digitally encoded graphic images, sometimes called blocks or tiles, can be efficiently downloaded for viewing on bandwidth limited wireless devices.

BACKGROUND OF THE INVENTION

Many images used on the world wide web are graphic images, as opposed to natural or photographic images of real images. Graphic images are generally images created by people with the assistance of computer tools. Examples of images are menus (including various types of listings), explanatory diagrams, maps, comics and cartoons, and images of documents and graphic drawings. Graphic images typically have very different data compression characteristics from natural and photographic images. While the present invention can be used with natural and photographic images, its benefits are believed to be strongest when used with graphic images. The terms "non-graphic image" and natural image are often used synonymously, even though non-graphic images may be computer generated or man-made in part or in whole. Non-graphic images, as that term is used in this document, generally include full color information (three color components are explicitly specified) for each pixel, and thus are not restricted to the colors in a color palette, such as a 256 color palette or a 1024 color palette.

A graphic image is defined for the purposes of this document to mean an image whose pixels have no more than 1024 distinct colors, and thus can be represented using relatively small palette-based pixel values.

Images are digitally encoded using a number of well known encoding methods. Some of the best known digital image encoding formats are GIF (graphic image format), PNG (portable networks graphics), BMP (bit map), PCX (PC paintbrush family, a fixed length encoding method), JPEG, various proprietary encodings, and various wavelet-based and wavelet-like-based encodings. A fairly complete listing of digital image encoding formats can be found at http://www.dcs.ed.ac.uk/home/mxr/gfx/2d-hi.html (The Graphics File Formats Page), and descriptions of these graphics encoding methods and formats can be found in many graphics textbooks, as well as in documents referenced by the aforementioned "The Graphics File Formats Page".

The present invention primarily concerns the encoding, decoding, transmission and management of bitmapped graphic image data, raster scanned graphic images, and run-length encoded and pattern encoded" images, which include images encoded using GIF, PNG and PCX. For the purposes of this document, the term "run length encoded" images is defined to include both traditional run length encodings of images, such as PCX encoded images, as well as "pattern encoded" images, such as GIF encoded images.

GIF and PNG are popular file formats for encoding images that are "palette based," but which present significant problems when downloading to bandwidth limited wireless devices having small display screens. Such devices typically can display only a small portion of a graphic image at any one time, because of the limited size of their displays, and also have limited memory for storing a downloaded image, making it impossible for many such devices to store large digital images. Also, the limited communication bandwidth of such devices, often just ten to fifty thousand bits per second, means that it would take several minutes or even longer to download many of the images that are routinely transmitted over the world wide web to desktop computers.

"Palette-based" images are images where the color of each pixel of the image is represented as an index or position in a specified color palette. For instance, many graphic images are digitally encoded using a 256 color palette, and each pixel of such an image is encoded as one of those 256 colors. Since it takes 8 bits to represent a selection of one of 256 colors, a very simple encoding would be to represent each pixel as an 8-bit index into the 256 color palette. A more sophisticated encoding method is to pair with an palette index a "run length value," where the run length value indicates the number of consecutive pixels in the image that all have the same color. "Consecutive pixels" are usually defined with respect to a raster scan of the image, and usually means a contiguous set of pixels on the same horizontal scan line. A next level of sophistication uses a lossless data compression method known as Lempel-Zif. The GIF and PNG graphic image formats use specific versions of the Lempel-Zif method. Since the actual encoding methods used in GIF, PNG and PCX are a matter of public record, a complete explanation of these encoding methods is not provided here.

Due to the manner in which GIF and PNG images are encoded, it is not possible to send a device just a small portion of the GIF image (other than the top portion of the image). Rather, the entire image file must be downloaded and processed to reproduce an arbitrarily selected portion of the image. For instance, if an image is 640×832 pixels, and the device in question has a display region of 64×64 pixels, the device can display at any one time less than 1% of the image. Downloading the entire 640×832 pixel image to the device via a wireless connection will take approximately 130 times as long as it would ideally take to download only the portion of the image to be viewed. Of course this assumes that small 64×64 images can be encoded as efficiently as the 640×832 image, which is generally not the case, but even if the encoding of the 64×64 image were only half as efficient as the encoding of the larger image, the transmission time of the larger image would still be about 65 times as long as the transmission time of the smaller image.

The present invention provides a highly efficient system, method and computer program product for encoding and re-encoding palette-based graphic images, in small portions called blocks, to enable portions of such images to be efficiently downloaded from a server to various devices for viewing. The present invention minimizes or reduces the encoding efficiency "penalty" incurred by using small images, herein called blocks, while at the same time providing a mechanism for enabling small images to be downloaded to wireless and other bandwidth limited devices very quickly.

SUMMARY OF THE INVENTION

In summary, the present invention is a system and method for processing an image file. The image file, which typically represents a bitmapped graphic image (sometimes called a raw graphic image), or more commonly, a palette-based image that has been encoded using a first predefined run-length encoding method, is decoded to produce an image data array, to be treated as a bitmapped (raw) graphic image. The image data array is divided into blocks, and either all the blocks or a majority of the blocks have a predefined fixed size, such as 32×32, 32×64, or 64×64 pixels. At least some of the blocks of the image are processed to produce a corresponding re-encoded block. In particular, each such block is independently processed by applying a plurality of distinct, lossless encodings to the block to produce an equal plurality of distinct re-encoded block versions. One of the plurality of distinct re-encoded block versions is selected in accordance with predefined selection criteria for use as the re-encoded block. Each re-encoded block is stored in a distinct data structure, such as a file.

In a client-server network, when a low bandwidth client device requests an image file, just the block image files needed by the client device are downloaded, thereby greatly reducing the request to display delay.

BRIEF DESCRIPTION OF THE DRAWINGS

Additional objects and features of the invention will be more readily apparent from the following detailed description and appended claims when taken in conjunction with the drawings, in which:

FIG. 8 is a flow chart of a preferred implementation of the "MaxBit" function used by the "nested quadratic splitting" (NQS) data compression method that is represented by the flow chart in FIG. 7.

FIG. 10 is a flow chart of a procedure for decoding MaxBit values in a compressed image block file.

FIG. 18 is a conceptual representation for an image combining procedure herein called alpha blending, whereby graphic information in one image can be superimposed on a second image.

FIGS. 19 and 20 are pseudocode representations of client device procedures for fading in and fading out the superimposition of a graphic image on a second image.

DESCRIPTION OF THE PREFERRED EMBODIMENTS

In this document, the terms "block" and "tile" are used interchangeably to mean a portion of an image. A block is generally a rectangular array of pixels. It is typically, but not always, a square array. The size of each block, called the block size, may of course vary from one implementation to another, and may change as memory arrays and transmission bandwidths become larger. In the preferred embodiments, each block is either 32×32 pixels, 32×64, or 64×64 pixels. In other embodiments, block may be 16×32, or 16×64 pixels, or 16×16 pixels, or even 128×128 pixels, and may other sizes as well.

The present invention may be implemented in a variety of devices that process images, including a variety of computer systems, ranging from high end workstations and servers to low end client computers, as well as in application specific dedicated devices, such as digital cameras, personal digital assistants, and telephones having image and message receiving capabilities.

System for Encoding and Distributing Multi-Resolution Images

Figure 1:
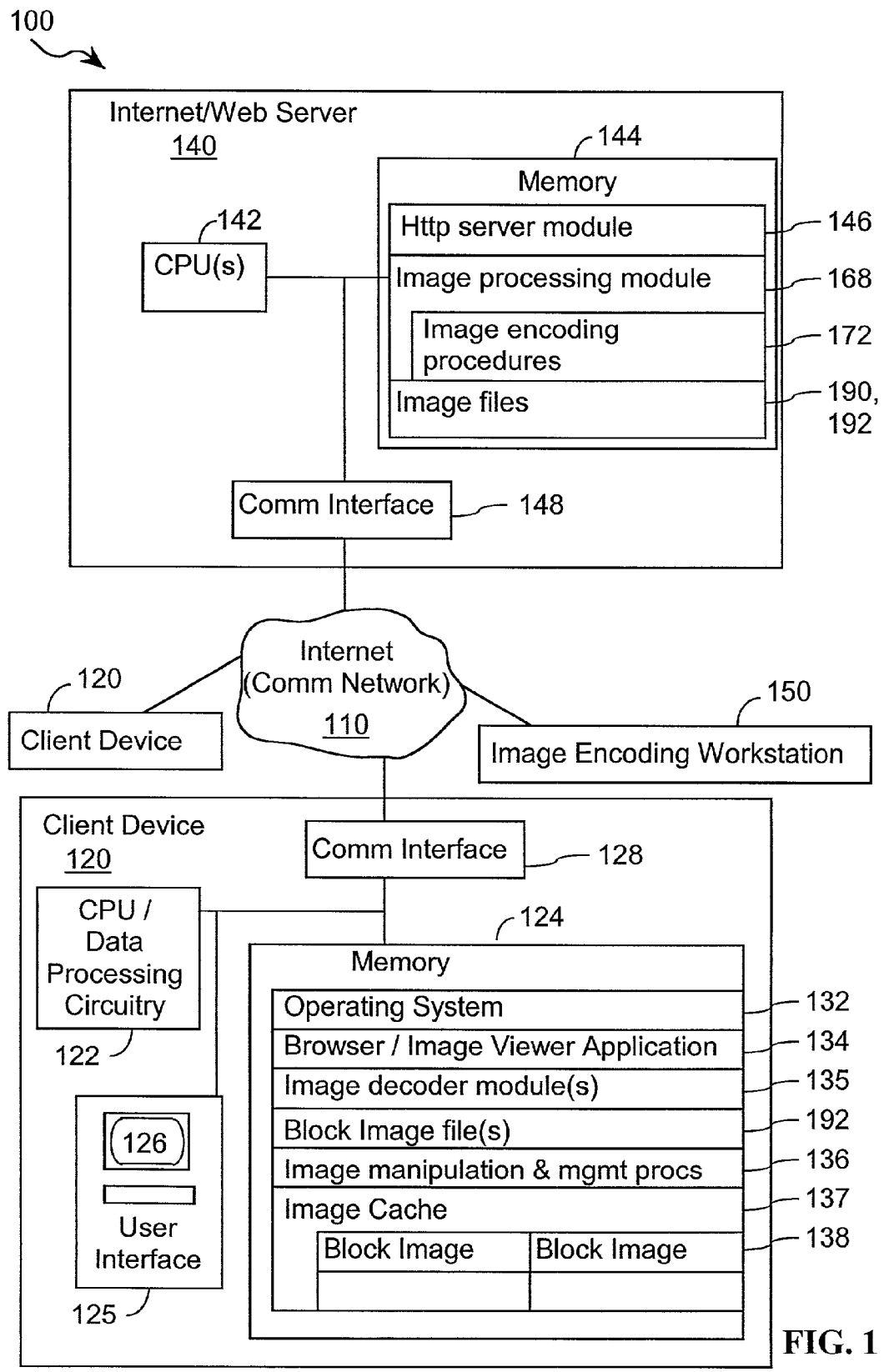
FIG. 1 is a block diagram of a distributed computer system, including a server and a number of client devices, for distributing images to the client devices.

FIG. 1 shows a distributed computer system, including a web or application server 140 and a number of client computers 120, for distributing images (i.e., image files) to the client computers via a communications network 110, such as the Internet, a wired and/or a wireless telephone network, or any other appropriate communications network, such as a local area network or Intranet. An imaging encoding workstation 150 prepares image files for distribution by the server 140. In some embodiments, the server 140 may also perform the image encoding tasks of the image encoding workstation 150.

A typical client device 120 will be a portable, wireless device, such as a personal digital assistant, a digital telephone with display, a personal computer with a wireless or other low bandwidth connection (e.g., having a bandwidth of 100 kilobits per second or less), or a computer controlled device dedicated to a particular task. In general, at least some of the client devices 120 will have low bandwidth connections to the server 140. The present invention is directed a system and method for facilitating fast distribution of graphic images to client devices having low bandwidth connections to the server.

In addition to client devices often having low bandwidth connections, some client devices have very limited processing power. These "low CPU bandwidth client devices" are typically client devices whose CPU has a processor clock rate of 25 MHz or less, and more generally are client devices whose CPU has a processor clock rate of 40 MHz or less. For such client devices, a different image encoding may be needed to minimize the total "request to display" delay time, where the request to display time includes both the image download time and the image decoding time. Some embodiments of the present invention accommodate low CPU bandwidth client devices by encoding block images in one way to minimize the size of the block image files (for use by client devices having good processing power), and encodes the block images in another way to minimize the request to display time (for use by low CPU bandwidth client devices).

The client device 120 will preferably include a central processing unit 122, memory 124 (including high speed random access memory, and non-volatile memory such as flash memory or disk storage), a user interface 125 including a display screen 126, and a network interface or other communications interface 128 for connecting the client device to the web or application server 140 via the communications network 110. The memory 124 will typically store an operating system 132, a browser application or other image viewing application 134, one or more image decoder modules 135, and an image cache 137 for storing block images 138 (decoded from downloaded block images files 192). The memory 124 may also optionally include image manipulation, transformation and management procedures 136, such as procedures for rotating images, overlaying images, panning and zooming, and so on.

The web or application server 140 will preferably include a central processing unit 142, memory 144 (including high speed random access memory, and non-volatile memory such as disk storage), and a network interface or other communications interface 148 for connecting the server to client devices and to the image encoding workstation 150 via the communications network 110. The memory 144 will typically store an http server module 146 for responding to http requests, including request for image files 190. Alternately, the memory 144 may store a server module that uses a protocol other than http, and that responds to requests for information and/or images. The server 140 may optionally include an image processing module 168 with encoding procedures 172 for encoding images as multi-resolution images.

Image Processing Computer System

Figure 2:
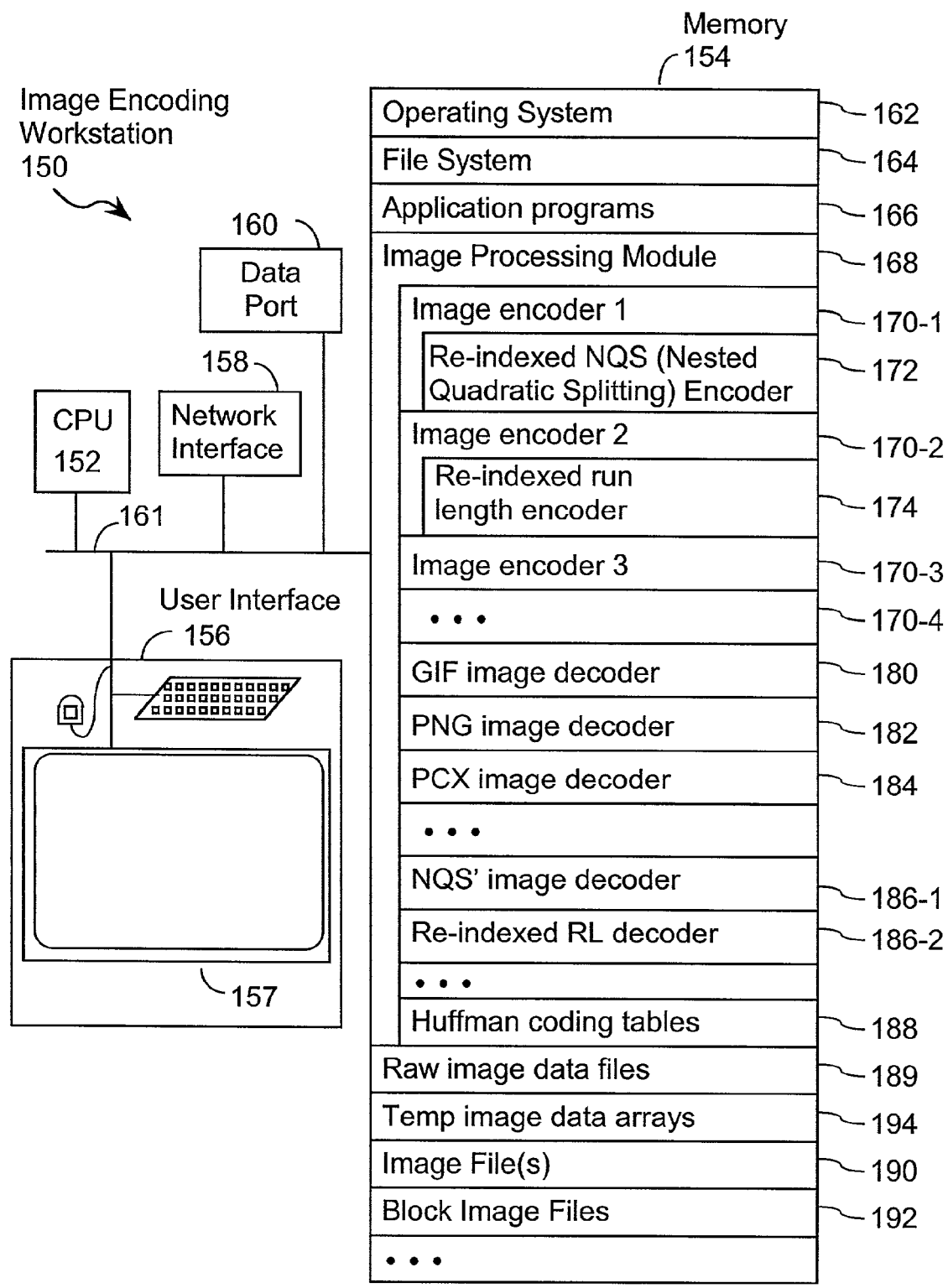
FIG. 2 is a block diagram of a computer system for encoding, decoding and re-encoding images in accordance with an embodiment of the present invention.

Referring to FIG. 2, the image processing workstation 150 may be implemented using a programmed general-purpose computer system. This figure may also represent the server, when the server performs image processing tasks. The computer system 150 may include:
- one or more data processing units (CPU's) 152;
- memory 154, which will typically include both high speed random access memory as well as non-volatile memory;
- a user interface 156, including a display device 157 such as a CRT or LCD type display;
- a network or other communication interface 158 for communicating with other computers as well as other devices; and
- one or more communication busses 161 for interconnecting the CPU(s) 152, memory 154, user interface 156, network interface 158 and data port 160.

The image encoding computer may optionally include a data port 160, such as for sending and receiving images to and from a digital camera or other device, although such image transfers might also be accomplished via the network interface 158.

The computer system's memory 154 stores procedures and data, typically including:
- an operating system 162 for providing basic system services;
- a file system 164, which may be part of the operating system;
- application programs 166, such as programs for viewing and manipulating images;
- an image processing module 168, for performing various image processing functions including those that are the subject of the present document;
- image files 190 representing various images;
- block image files 192, each representing a small block of a larger image; and
- temporary image data arrays 194 for intermediate results generated during image processing and image regeneration.

The computer 150 may also include a http server module 146 (FIG. 1) when this computer 150 is used both for image processing and distribution of multi-resolution images.

The image processing module 168 may include two, and preferably three or more image encoder modules 170, and a number of image decoder modules 180, 182, 184. In a preferred embodiment, the image decoder modules include a GIF image decoder 180, a PNG image decoder 182 and a PCX image decoder. In addition, the image processing module 168 may include decoder modules 186 for decoding the image files generated by the image encoder modules 170. In a preferred embodiment, the encoder modules include a re-indexed NQS (nested quadratic splitting) encoder 172, a re-indexed run length encoder 174, and a pattern-based encoder such a GIF encoder 170-3. The decoder modules 186 include corresponding decoders. Both the encoder and decoder procedures 170 and 186 make use of a set of fixed Huffman coding tables, for efficiently encoding values such as run lengths and re-mapped palette index values.

The image encoder modules 170 produce so-called "block image files," each of which represents a small portion or block of a graphic image. The set of block image files for an image may include some blocks that are encoded using a first encoding procedure, and other blocks that are encoding using a second encoding procedure. More generally, if the image processing module 168 includes N (e.g., four) image encoders, the blocks of any single image may be encoding some one, two or even all of the different image encoders. Each block image file includes a coding type identifier, which indicates the encoder or encoding method that was used to encode the block image file. For a typical 640×832 image, re-encoded using the present invention into one hundred thirty blocks of size 64×64, two or more of the blocks image files will be encoded using the remapped NQS coding method of the present invention, and two or more of the block image files will be encoded using the remapped run length coding method of the present invention. The density of features, and their distribution in each block, determines which encoding method will be the best one to use for each block.

The procedures in the image processing module 168 store partially transformed images and other temporary data in a set of temporary data arrays 192.

Overview of Image Encoding or Re-Encoding

Figure 3:
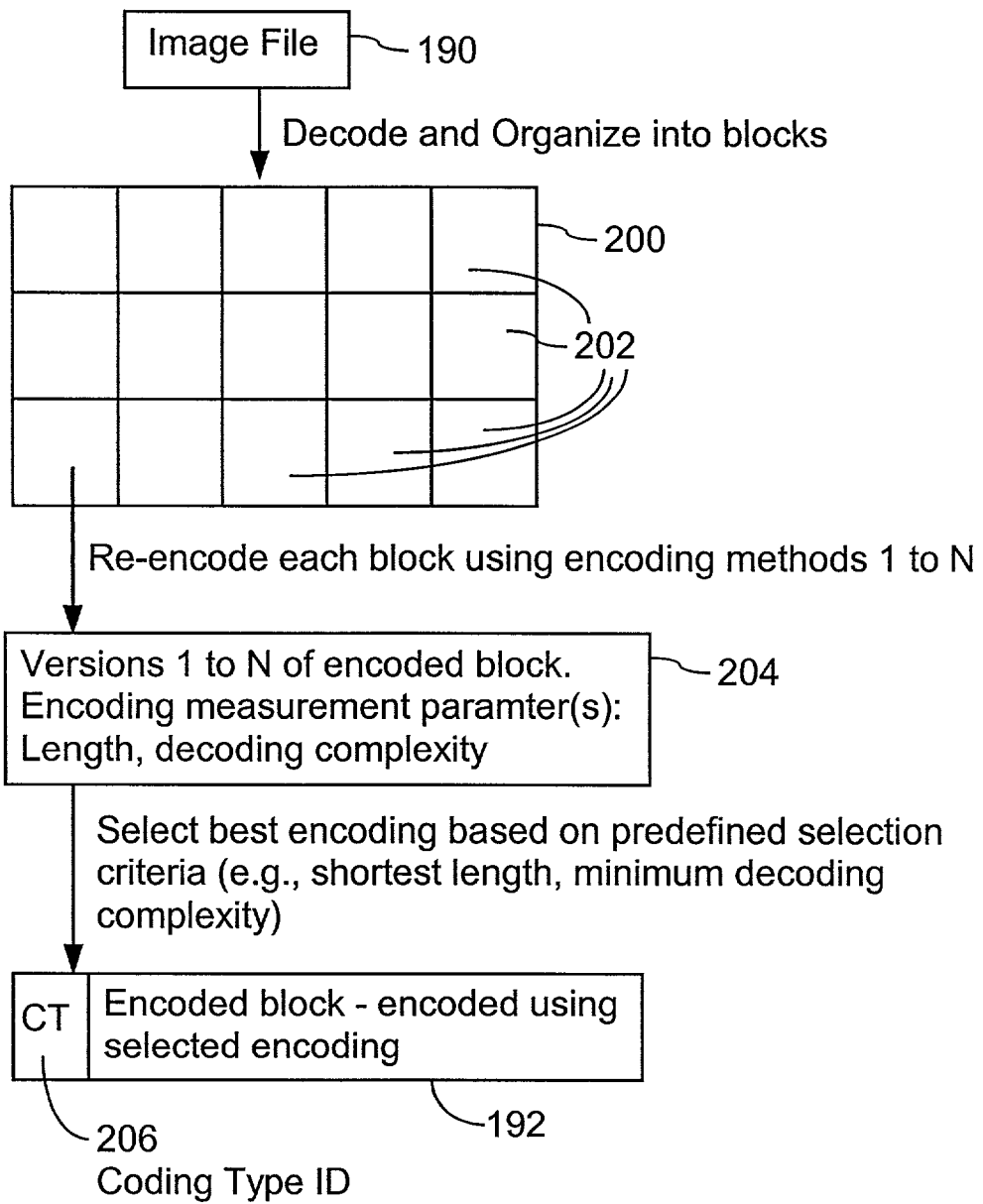
FIG. 3 is a conceptual representation of a process of re-encoding a specified image file into a set of smaller image files, each representing a block of the image represented by the specified image file.

Referring to FIG. 3, a specified image file 190, typically encoded as a GIF, PNG or PCX file, is obtained from a computer, or possibly from an application running on the same system as the image encoding workstation. The specified image file 190 is decoded into an image array 200. Alternately, a bitmapped (raw) image file is treated as n image array 200. As shown, the image array 200 is divided, for data processing purposes, into blocks 202. That is, the array 200 need not be physically divided into blocks, rather the image data in the array is processed on a block by block basis. The blocks, also sometimes called tiles, contain non-overlapping portions of the image data. As explained above, blocks are generally rectangular and most of the blocks for an image will have a particular fixed size, such as 32×32 (or any of a large number of other possible sizes). If the size of the image array is not an integer multiple of the block size in each dimension, blocks along two edges of the image array may be truncated in one or both dimensions, and thus these edge blocks may have a different size than the other blocks. Alternately, the edge blocks may be treated as having the standard block size, but the unused portions of these blocks are filled with null data or other appropriate background image data.

If the image is a palette-based graphic image obtained directly from an application, the image may be initially coded as an uncompressed palette-based image (e.g., with each pixel being represented by an 8-bit palette index), in which case it is not necessary to decode an image file.

Next, the image data in the image array is re-encoded, one block at a time, using M distinct, lossless encoding methods, 1 to M, to produce M encoded versions 204 of each block. For each block, the encoding work station selects the best encoding based on a predefined selection criteria, and then stores the selected encoding as a block image file 192. Each block image file 192 contains a coding type identifier 206 that identifies how the block image file was encoded, and thus what procedure is needed to decode its contents.

Image Encoding or Re-Encoding

Figure 4:
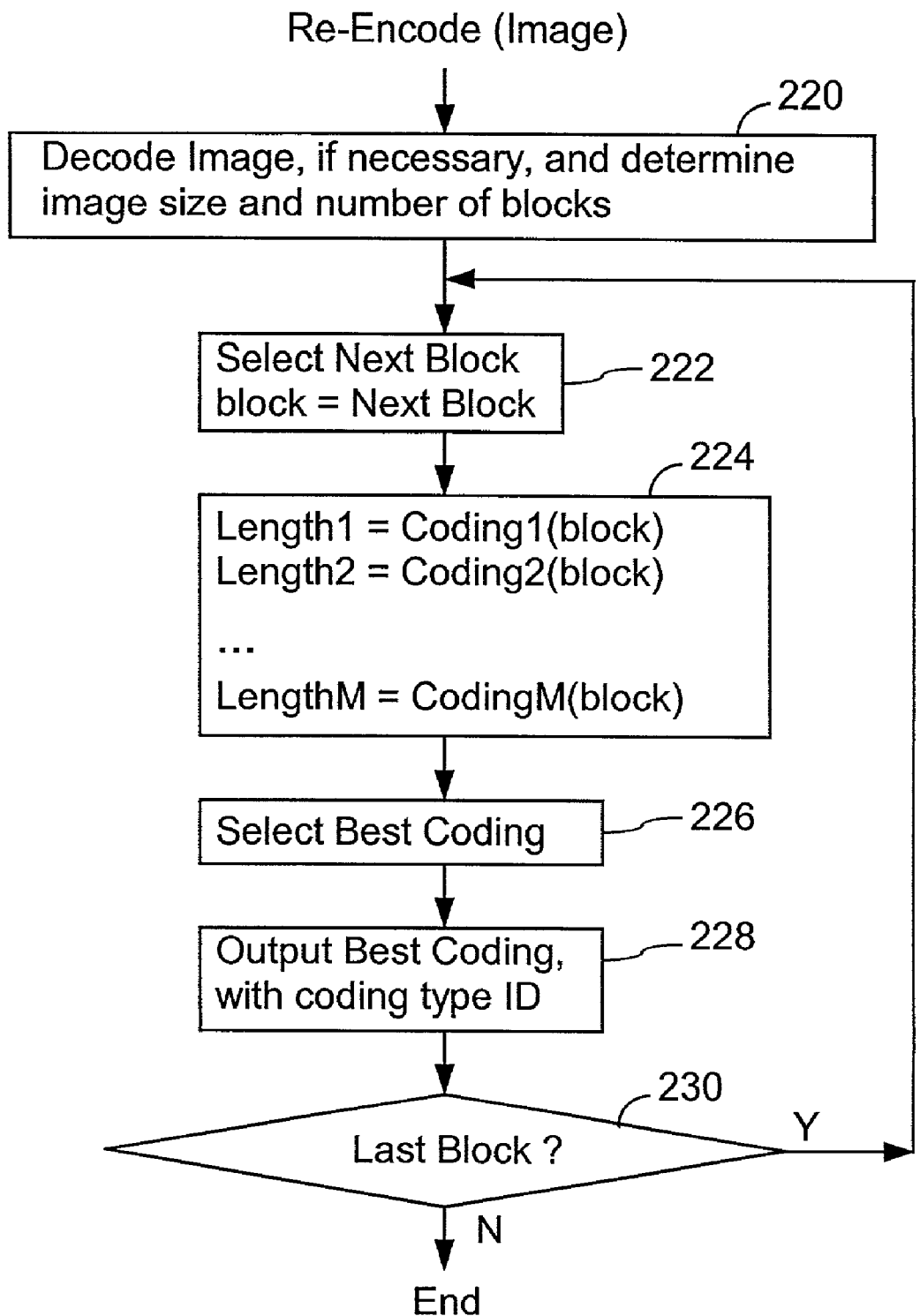
FIG. 4 is a flow chart of a process for encoding blocks of an image.

Referring to the flow chart in FIG. 4 of the image re-encoding procedure used in a preferred embodiment, a specified image file is first decoded (220), if necessary, to produce an image array, sometimes called the "raw" image array, because the image data in the array is not compressed. The image data for each pixel consists of a palette index, which indirectly specifies the color of the pixel, via a color palette. The size of the image, and thus the number and arrangement of blocks in the image is also determined (220).

Block positions are specified with respect to an origin at the upper left corner of the image, with the first coordinate indicating the Y position of the tile (or a pixel or coefficient within the block) and the second coordinate indicating the X position of the tile (or a pixel or coefficient within the block). Thus a block at position 0,128 is located at the top of the image, and has its origin at the $128^{th}$ pixel of the top row of pixels. Each block is identified by a tuple (h,w,k), which represents a block whose origin is at y,x=(h,w) and that extends vertically and horizontally $2^k$ positions. For instance, if a block has its origin at 0,0 and has a size of 64×64 pixels, the block is identified by the tuple (0,0,6).

The blocks are processed in a predetermined raster scan order. For example, the blocks in a top row are processed going from one end (e.g., the left end) to the opposite end (e.g., the right end), before processing the next row of blocks immediately below it, and continuing until the bottom row of blocks of the image data has been processed.

Once the image has been decoded and its dimensions have been determined, a first or next block of the image is selected (222) for processing. The block is encoded using M different coding methods, labeled 1 to M, and one or more measurements of coding quality are determined for each coding of the block (224). For instance, as shown in FIG. 4, a coding length (e.g., measured in bits, bytes or words) is determined for each coding of the block. Alternately, or in addition, a "decoding complexity measurement" may be computed for each coding of the block, where the "decoding complexity measurement" is indicative of the number of CPU cycles required to decode the encoded block A best coding for the block is selected (226), and that version of the encoded block is output, along with a coding type identifier, and stored in a block image file (228). The block encoding steps 222 through 228 are repeated 228 until all the blocks of the image have been processed (230).

In an alternate embodiment, such as an embodiment in which it is known that only certain portions of an image will be downloaded to low bandwidth client devices, only some of the blocks of the image are re-encoded. For instance, some images may have all their information content in one region, such as the upper left region of the image, while the rest of the image is either empty or only contains a background pattern. For images of this type, the image processing module may be configured to encode a rectangular set of blocks that contain all or most of the useful information in the image, thereby changing the effectively cropping the original image.

For some types of quality measurements for certain types of image block encodings, it may be necessary to both encode and decode the block in order to determine the value of the quality measurement. In an alternate embodiment, the length or other block coding quality measurement is determined for one or more of the coding methods without actually encoding the image block, but instead by performing a measurement function on the block.

Block Image Decoding and Displaying at Client Device

Figure 5:
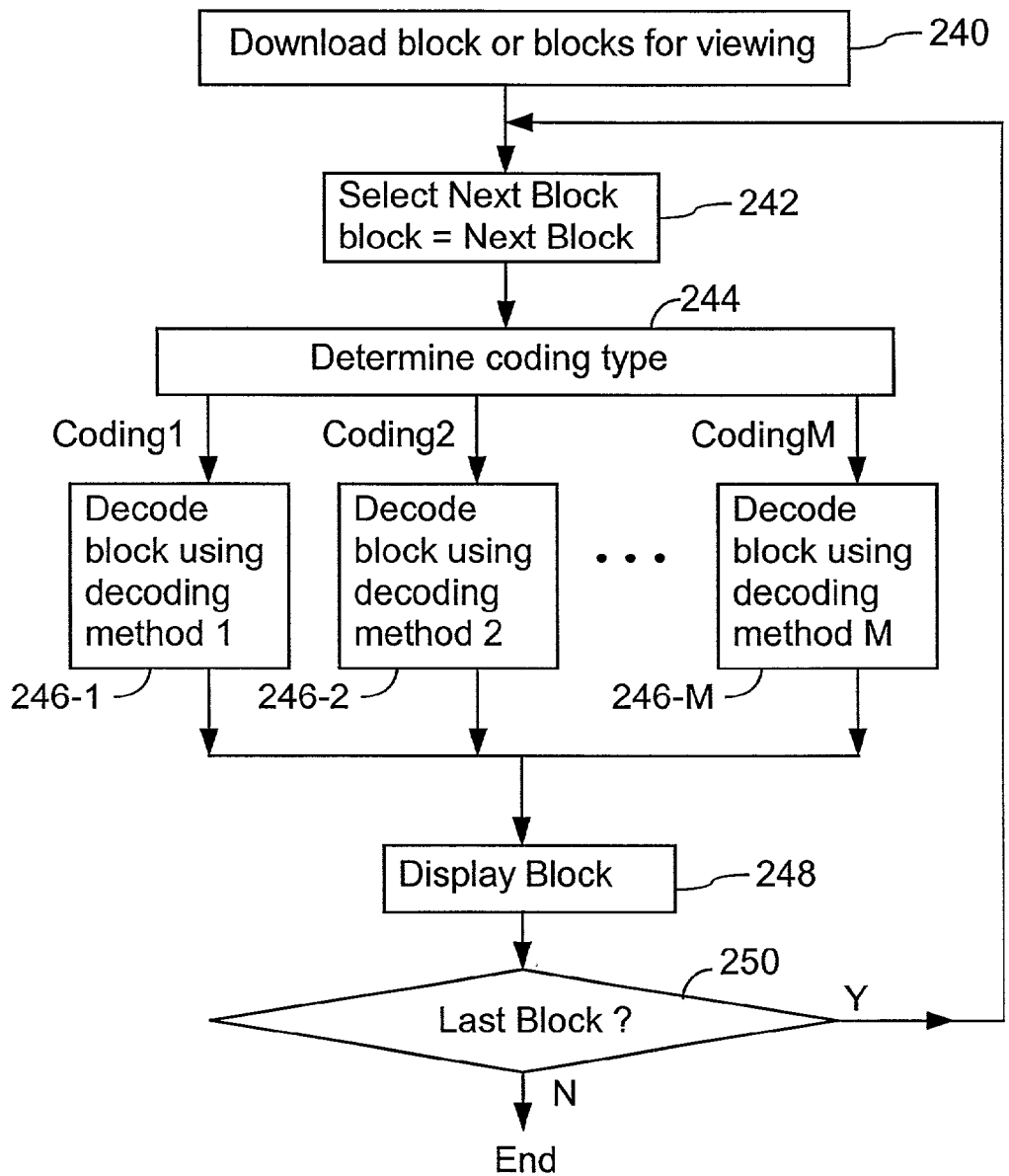
FIG. 5 is a flow chart of a process performed by a client device for downloading, decoding and displaying one or more blocks of an image.

Referring to FIG. 5, a client device downloads one or more blocks of an image for viewing (240). This is typically accomplished by sending a request to the server, for example by indicating in the request an image position to be displayed at the origin (e.g., upper left corner) of the device's display, and the horizontal and vertical extent of the portion of the image to be displayed. The server determines from the request which blocks (i.e., block image files) of the requested image to download to the client device so that it can display the requested portion of the image. In many embodiments, the request and response communications are performed via a wireless network connection, and in other embodiments may be performed over other low bandwidth connections. Clients with high bandwidth connections (e.g., over 256 kilobits per second), which are not the primary concern of the present invention, may either download block image files or may instead download the entire image file, depending on the decoding capabilities of the client device.

A decoding module in the client device selects a first or next downloaded block for decoding (242). The block image file is inspected to determine its coding type (244). The coding type, including any applicable coding subtype(s), is preferably indicated in a header or beginning portion of the file. The block image file is then decoded using the applicable decoding procedure (246), as determined by the coding type. The decoded block is then displayed by the client device (248). If there are more blocks to be displayed that require decoding (250), steps 242 through 246 are repeated. As a result, portions of the client device's display are populated with image blocks as they are received and decoded. Alternately, the client device may be configured to delay displaying the image until all the needed blocks have been received and decoded, in which case the display step 248 is performed after the decoding loop end determination (250).

A general description of the re-encoding and decoding methodology of the present invention has been provided. Specific block encoding and decoding procedures of the preferred embodiments are described next.

Pixel Remapping and Nested Quadratic Splitting Encoding Method

One of the M encoding methods of the preferred embodiment is based on a sparse data encoding method called Nested Quadratic Splitting (NQS). NQS is described in detail below. This sparse data encoding method is an improved version of the NQS sparse data encoding method described in U.S. Pat. No. 5,949,911, entitled "System and Method for Scalable Coding of Sparse Data Sets," which is hereby incorporated by reference as background information. The NQS procedure used in the present invention differs from the procedure described in the '911 patent in a number of ways. For instance, since the pixel values in the present invention are always non-negative integers, there is no need to encode sign bits in the NQS procedure used by the present invention.

Figure 6D:
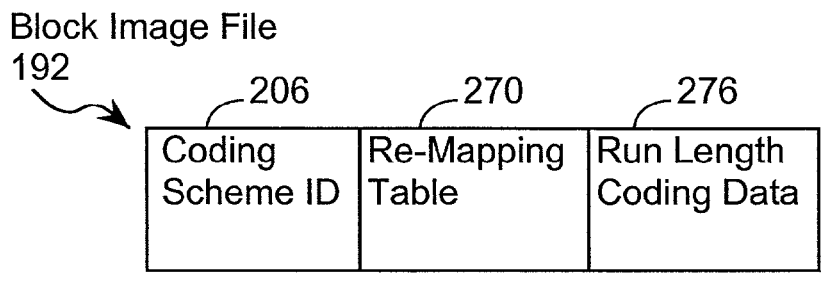
FIGS. 6A, 6B, 6C and 6D depict data structures used in a preferred implementation of a "nested quadratic splitting" (NQS) data compression method.
Figure 6A:
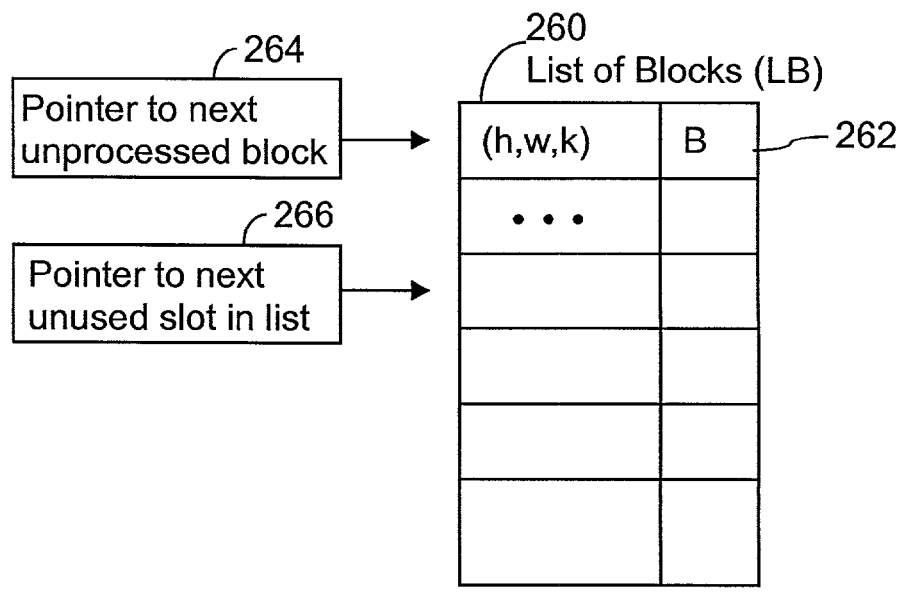

Referring to FIG. 6A, the main "bookkeeping" data structure used by the NQS encoder and decoder procedures is a block list data structure 260, which lists data blocks (i.e., subarrays of data) to be processed. The block list 260 contains an entry 262 for each block on the list of blocks. The entry 266 for each data block includes (A) a block identifier, which indicates the origin of the data block and the height and width of the data block, and (B) a value indicating the maximum number of bits required to represent any data value in the data block (i.e., $int(1+log_2 V)$, where V is the largest data value in the data block and $int(x)$ is the integer portion of x). In addition, the list 260 has a first pointer 264 that points to the block highest in the list 260 that has not yet been processed, and a second pointer 266 that points to the highest unused slot in the list 260.

TABLE 1

Definitions of Terms used in Flow Chart Figures

| | |
|---|---|
| node | a single particular position in a data array (i.e., image array) |
| (h, w, k) | this represents a data block whose origin is at y, x = (h, w) and that extends vertically and horizontally $2^k$ positions. |
| V (h, w, k) | Maximum value of all nodes in the (h, w, k) block |
| LB | List of blocks data structure |
| V (i, j) | the value of the (i, j) node |
| MaxBit (h, w, k) | the maximum number of bits required to encode the absolute value of any data value in the block (i.e., $int(1 + log_2 V)$) |
| (h, w, k)'s subblocks | (h, w, k − 1), (h, w + $2^{k-1}$, k − 1), (h + $2^{k-1}$, w, k−1), (h + $2^{k-1}$, w + $2^{k-1}$, k − 1) |
| nodes of | (h, w), (h, w + 1), (h + 1, w) (h + 1, w + 1) |

TABLE 1-continued

Definitions of Terms used in Flow Chart Figures (h, w, 1)

Table 1 provides definitions of terms and abbreviations used in the flow chart figures.

Figure 6B:
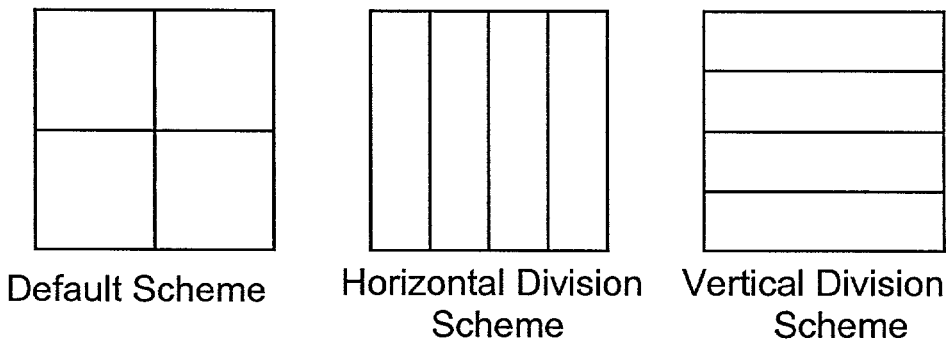

Referring to FIG. 6B, during processing of an image block, the block is divided into subblocks. In the preferred embodiments, the block is a square that is divided into four equal size subblocks, which are also squares. However, in other embodiments, the block could be divided otherwise, such as into four vertically or horizontally oriented rectangles.

Figure 6C:
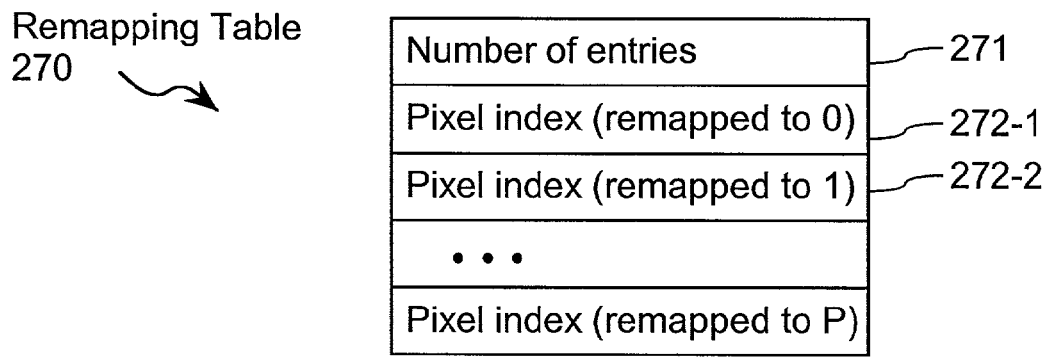

FIG. 6C shows a pixel value remapping table 270. The table includes a count field 271 indicating the number (P) of entries 272 in the table, and each entry 272 in the table indicates the original palette index value (also called a pixel value) that has been remapped to a new pixel value. In particular, the first entry 272-1 represents the palette value for pixels remapped to a value of zero, the next entry 272-2 represents the palette value for pixels remapped to a value of 1, and so on.

FIG. 6D shows the data structure of a block image file 192 generated by the pixel remapping and NQS coding procedure. The file includes a coding type identifier 206, indicating how the block was encoded, a pixel remapping table 270, and a set of NQS encoded pixel values 276. The content of the pixel remapping table 270 and NQS encoded pixel values 276 is described in more detail below.

Pixel Value Remapping

Figure 7:
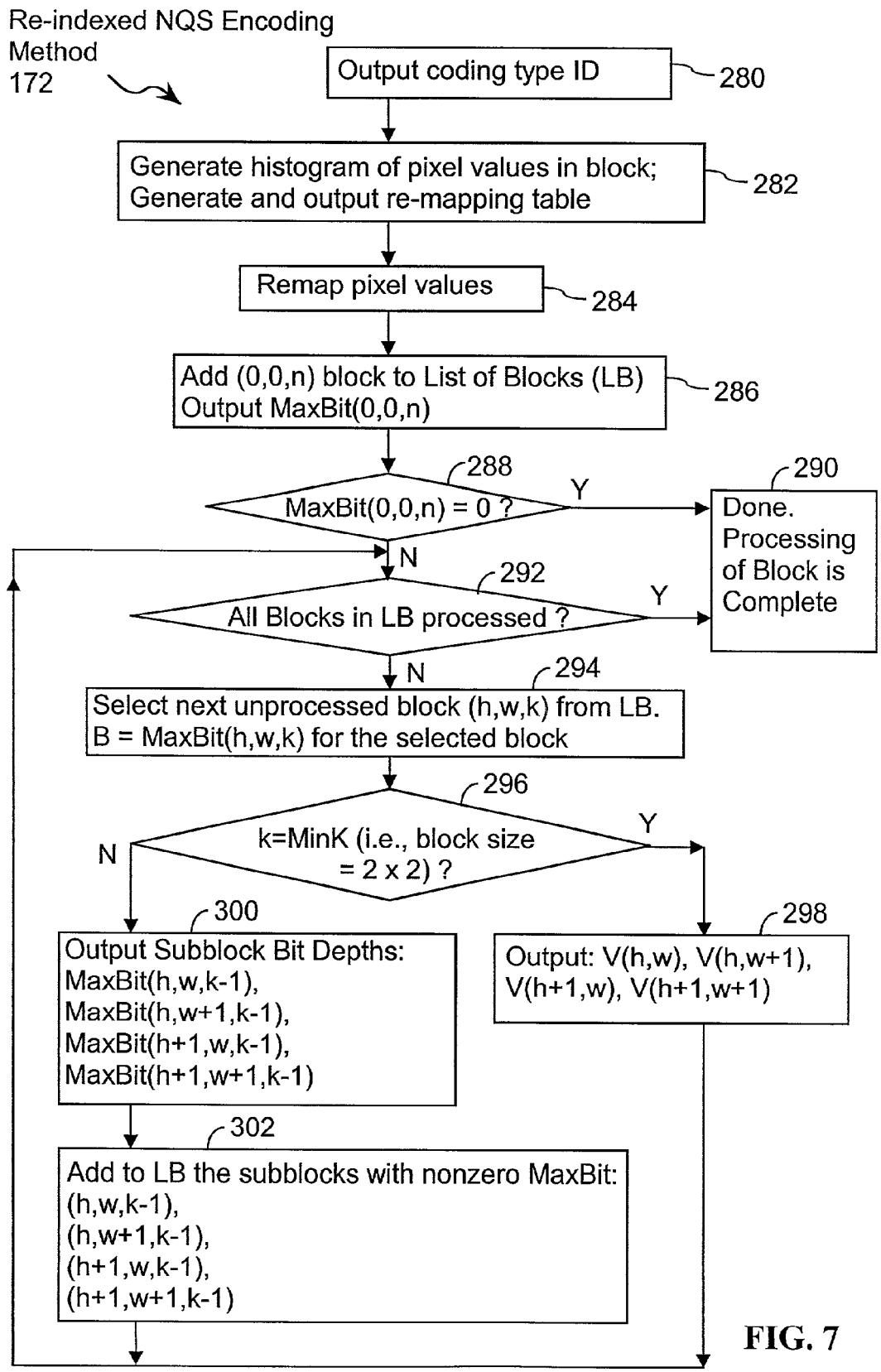
FIG. 7 is a flow chart of a method of encoding or re-encoding (after decoding) a block of an image using pixel value remapping and a "nested quadratic splitting" (NQS) data compression method.

Referring to FIG. 7, the remapping and NQS procedure for encoding a block of data values begins by outputting the coding type identifier for this encoding procedure (280). All bits output by the encoding procedure become part of the resulting block image file. Furthermore, the bits in the block image file are ordered in exactly the same order that they are output by the encoding procedure. The procedure next generates a histogram of the pixel values in the block (282). The histogram represents the number of occurrences of each palette index value in the block. For instances, if the pixels in a 64×64 image block specify just two palette index values, one index value might have count of, say, 100, and the other would have a count of 3996 (i.e., $64^2-100$). A remapping table 270 (FIG. 6C) is generated so as to map the most frequent palette index value to a new index value of zero (0), the next most frequent palette index value is mapped to a new index value of one (1), and so on. Furthermore, the remapping procedure determines the number of palette index values with more than zero occurrences in the block, and this information is included in the remapping table (see 271, FIG. 6C). Next, all the pixel values in the block are remapped in accordance with the remapping table, and the remapping table is included in the block image file that is being generated. As a result, the most common remapped pixel value in the block will be zero (0), the next most common pixel value will be one (1), and so on.

Sparse Data Encoding Using Nested Quadratic Splitting

Still referring to FIG. 7, after the pixels have been remapped, a first entry, representing the entire block (image array), is put in the list of blocks (286). The list of blocks is empty except for this first entry. Also, at step 286 the encoding procedure determines and outputs the value of MaxBit(0,0,n), which is equal to the maximum number of bits required to encode any data value in the entire array being analyzed, and outputs that value using a predefined number of bits (e.g., 4 bits, since the maximum bit depth using conventional color palettes is eight bits). The "MaxBit" of a data array is sometimes called the bit depth of the array. If MaxBit(0,0,n) is equal to zero (288-Yes), that indicates that all the nodes in the array to be encoded are equal to zero, and therefore the encoding procedure is complete (290). In other words, the entire block image contains pixels of just one color, and is represented by the remapping table and the MaxBit(0,0,n) value.

If the block contains at least one nonzero value (288-No), and at least one block listed in the block list has not yet been processed (292-No), which is normally the case at the beginning of the NQS encoding procedure, the procedure selects the next unprocessed data block (h,w,k) from the block list and sets a variable B equal to the maximum number of bits required to encode any data value in the selected data block (294).

If the size of the selected data block, as represented by the "k" parameter in the (h,w,k) block identifier, is equal to a predefined minimum block size such as 2×2 (296-Yes), the procedure outputs the values of all the pixels in the block (298). Each pixel value is output using B bits, where B is the number of bits denoted in the block list for this block, and is equal to the maximum number of bits (MaxBit) used by any data value in the selected block.

In an alternate embodiment, the minimum block size may be larger than 2×2; for instance a minimum block size of 4×4 could be used. However, in general, using a larger minimum block size will, on average, result in larger block image files.

If the size of the selected data block, as represented by the "k" parameter in the (h,w,k) block identifier, is not equal to or smaller than the predefined minimum block size (296-No), the procedure outputs (300) a set of four bit depth values representing the maximum number of bits required to encode each of the four subblocks of the selected block. These four bit depth values are MaxBit(h,w,k−1), MaxBit(hw+1,k−1), MaxBit(h+1,w,k−1), and MaxBit(h+1,w+l,k−1).

The bit depth values are preferably encoded efficiently, for example by using "differential encoding." Differential encoding, in this instance, means encoding the difference between the maximum number of bits, B, for the current block B and the maximum number of bits needed for each of the subblocks. It is noted that, by definition, at least one of the subblocks will have the same maximum number of bits (i.e., bit depth) as the current block, and thus the differential value to be encoded will be zero for those subblocks having the same bit depth as the current block. In addition, the procedure adds each of the subblocks having a non-zero bit depth to the list of blocks LB (302). Step 300 is shown in more detail in FIG. 8.

Referring to FIG. 8, in a preferred embodiment the differential bit depth value for each subblock is encoded as follows. The variable b is set equal to the maximum number of bits required to encode any data value in the subblock. If b=0, that means that all values in the subblock are equal to zero, in which case a value of 0 is output using B bits. (B is the maximum number of bits required to encode any data value in the parent, i.e., current, data block.) Otherwise, if b is not equal to 0, then (A) a value of 0 is output using B−b bits, and (B) a value of 1 is output using 1 bit. In other words, the value b is encoded as B−b "0" bits followed by a "1" bit.

For example, if B=6 and b=4, then the differential bit depth is represented by the string "001". In another example, if B=6 and b=6, the differential bit depth is represented by the string "1". In an alternate embodiment, each differential bit depth value B−b may be encoded using a fixed-table Huffman coding method. In other alternate embodiments, other methods may be used to efficiently represent the bit depth values of the four subblocks.

Referring again to FIG. 7, after the current block has been processed, either by outputting its pixel values (298) or by outputting the bit depths of its subblocks and adding the subblocks to the list of blocks (300,302), the pointer 264 (FIG. 6A) to the next block will be advanced by one position at step 294 if there are any unprocessed data blocks left in the block list (292).

The above described procedure continues until all the blocks in the block list have been processed (292), at which point the encoding of the data analysis array is complete (290).

Pixel Remapping and Nested Quadratic Splitting Decoding Procedure

Figure 9:
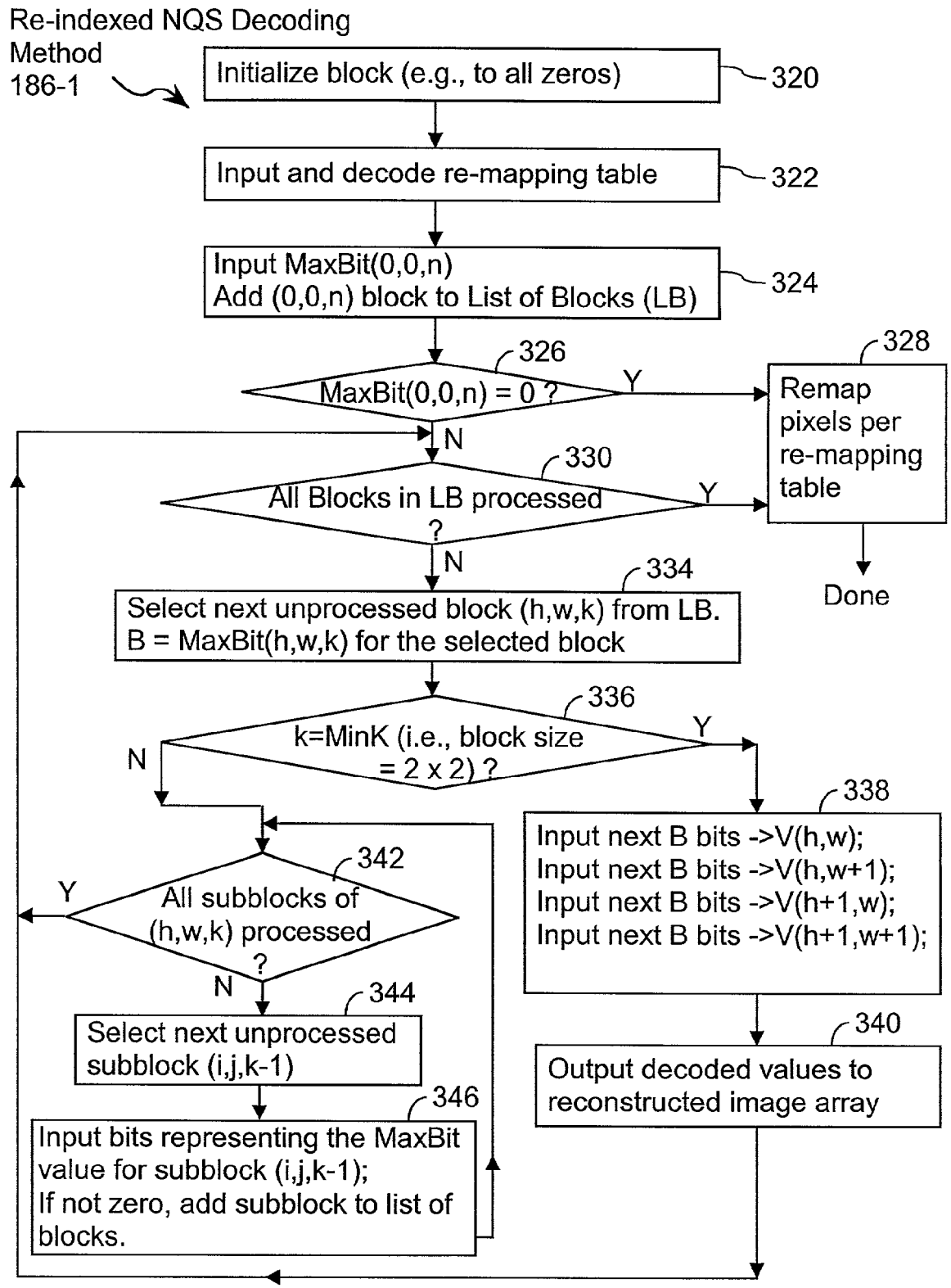
FIG. 9 is a flow chart of a preferred implementation of a method of decoding an image block that has been encoded using the pixel value remapping and NQS data compression method of the present invention.

Referring to FIGS. 9 and 10, the NQS decoder procedure 186-1 works, in general, by reading and interpreting the encoded data so as to reverse the process performed by the encoder procedure 172. The bits of the encoded data are read, in order, in a single pass from the first bit to the last. When the last data bit in the encoded data has been processed, and the decoded pixel values have been remapped into palette index values, reconstruction of the encoded block is complete.

As the encoded data is read, entries are added to the block list to identify the data blocks and subblocks that will be processed later in the procedure, along with the data indicating the maximum number of bits needed to encode the data in those blocks and subblocks. Data blocks and subblocks are analyzed in the order they appear in the encoded data. Whenever a subblock is processed, if the subblock is entirely filled with zero data (i.e., its data values all equal to zero), the relevant portion of the reconstructed image data array is filled with zero data values. Otherwise, subblock identifiers are added to the block list until subblocks whose size is the minimum block size (e.g., 2×2) are encountered, at which point the four values in the subblock are decoded and output to the reconstructed image data array.

Referring to FIG. 9, the decoder procedure begins by initializing the data array for the block (herein called the block image array or the reconstructed image data array) (320), for instance to all zero values, and then reading (inputting) the remapping table 270 (FIG. 6C) stored in the block image file (322). It is assumed that the coding type identifier was read prior to executing the decoding procedure, since the decoder procedure is selected on the basis of the coding type identifier at the beginning of the block image file.

Next, the procedure reads the bit depth value of the block, MaxBit(0,0,n), from the block image file and puts a first entry, representing the block, in the list of blocks (324). The list of blocks is empty except for this first entry. The first entry in the list of blocks specifies the bit depth value for the block. If the bit depth of the block is equal to zero (326-Yes), that indicates that all the nodes in the array to be decoded are equal to zero, and therefore the NQS decoding of the block is complete. All that remains at this point is to remap the pixel values back to their original palette index values, using the remapping table 270 obtained from the block image file (328).

If at least one block listed in the block list has not yet been processed (330-No), which is generally the case at the beginning of the decoder procedure, the procedure selects the next unprocessed block (h,w,k) from the block list and reads from the block list a value B equal to the bit depth of the block (334).

If the size of the selected block is the predefined minimum block size, such as 2×2 (336-Yes), the decoder procedure inputs and decodes the bits representing all the pixels of the block (338), each of which is represented by a set of B bits, where B is the bit depth of the block. The resulted decoded pixel values are output to the reconstructed block image array (340).

If the size of the selected block is not the predefined minimum block size (336-No), the following steps are performed for each of the four subblocks of the selected block. Steps 342 and 344 are used to select each successive subblock and to exit the loop when all four subblocks have been processed. For each subblock, the bits representing the bit depth of the subblock are read and decoded (346). As shown in FIG. 10, in a preferred embodiment, the bit depth decoding (346) for each subblock is accomplished by reading the encoded data bits until either a 1 bit is encountered or B bits are read without reading a 1 bit. The variable "repeat-times" keeps track of how many 0 bits have been read. If a 1 bit is read before repeat-times reaches a value of B, the subblock is added to the block list and a value of "B—repeat-times" is stored in the block list for the subblock, representing the maximum number of data bits used to encode the data in the subblock. If B zero bits are read, then the subblock contains only zero data and no entries are added to the block list (422). Note that no data values are written to the reconstructed image data array in step 346 because there is no need to write zero data values to the reconstructed image data array (see step 320 in FIG. 9). Steps 342, 344 and 346 (FIG. 9) are repeated until all four subblocks of the selected data block have been processed. Then the pointer 264 (FIG. 6A) to the next processed block is advanced by one position at step 334 if there are any unprocessed data blocks left in the list of blocks (330).

The above described procedure continues until all the blocks in the list of blocks have been processed (330-Yes), at which point the decoded pixel values are remapped into palette index values in accordance with the remapping table in the block image file (328). In an alternate embodiment, pixel remapping is performed each time data values are written to the block image array. For instance, steps 320 and 322 would be reversed in order so that block image array is initialized to make all pixels equal to the palette index value that was remapped to pixel value zero. In addition, at step 340, each decoded pixel is remapped before being output to the block image array.

Pixel Remapping and Run Length Encoding Method

Figure 11:
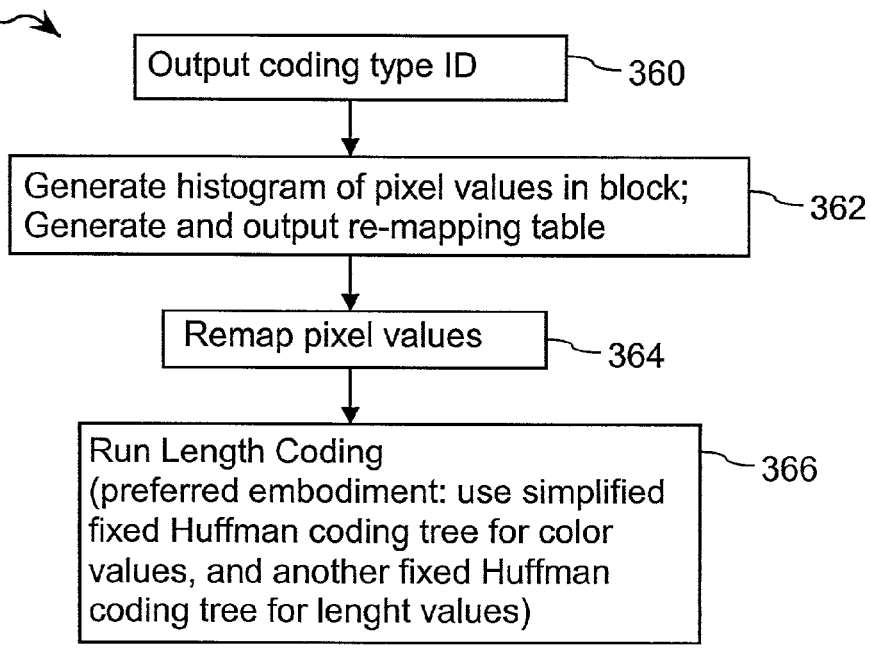
FIG. 11 is a flow chart of a procedure for encoding or re-encoding an image block using pixel value remapping and run length coding of the remapped pixel values.

Referring to FIG. 11, the second block image encoding method used in a preferred embodiment is called the remapping and run length encoding procedure. This procedure for encoding a block of data values (herein called pixel values or palette-index values) begins by outputting the coding type identifier for this encoding procedure (360). As explained above, all bits "output" by the encoding procedure become part of the resulting block image file. Furthermore, the bits in the block image file are ordered in exactly the same order that they are output by the encoding procedure.

Next, a histogram of the pixel values in the block is generated (362). However, a different histogram is used by this encoder than the one used with the NQS encoder. In particular, the histogram generated by the run length encoder represents the number of contiguous blocks of pixels for each palette index value in the block. For instance, if the pixel values in the image block include the following sequence

AAAAAAAABABCCCBCC . . .

the histogram count (for this portion of the image block) for A is only 2, because there are just two contiguous blocks of A pixels, the count for B is 3, and the count for C is 2. This second histogram method is used because a pixel value is written only once to the block image file for each contiguous block of pixels having that pixel value.

A remapping table 270 (FIG. 6C) is generated so that the most frequent palette index value (in the histogram generated as described above) is mapped to a new index value of zero (0), the next most frequent palette index value is mapped to a new index value of one (1), and so on. Furthermore, the remapping procedure determines the number of palette index values with more than zero occurrences in the block, and this information is included in the remapping table. The remapping table is output to the block image file (362), and all the pixel values in the block are remapped in accordance with the remapping table (364).

The number of distinct pixel values in a block is typically much smaller than the full set of possible palette index values (e.g., 64). To reduce the size of the block image file, the remapping and run length encoding procedure uses a reduced size palette for each block, which in turn reduces the number of bits required to represent each pixel value.

More specifically, the number of bits needed to represent any one pixel in the block is determined by computing roundup($\log_2$(DPV)), where DPV is the number of distinct pixel values in the block, and roundup(x) represents the smallest integer that is greater than or equal to x. DPV is also the number of entries in the remapping table. Thus, if the number of distinct pixel values in the block is two, only one bit is needed to encode each remapped pixel. If the number of distinct pixel values in the block is six, three bits are needed to encode each remapped pixel.

In one preferred embodiment, a predefined Huffman coding table is used to represent remapped pixel values. For example, if the number of distinct pixel values is six, the two most frequently used pixel values will be represented by 2-bit Huffman codes and the other four pixel values will be represented by 3-bit Huffman codes. More generally, the Huffman coding table used depends on the number of distinct pixel values in the block. If $\log_2$(DPV) is not equal to an integer, then a predefined Huffman coding table corresponding to the value of roundup($\log_2$(DPV)) is used to encode the remapped pixel values. Huffman coding the remapped pixel values reduces the size of the block image file, and increases decoding complexity only marginally.

Next, the remapped bits of the block are run length coded. Any conventional run length coding scheme can be used. Typically, the pixels in each raster scan line of the block are represented by a set of tuples, each of the form: (run length, pixel value). Thus the run length data in the block image file will consist of a list of (run length, pixel value) tuples. The first tuple in the list represents pixel values at the beginning of the block and the last tuple in the list represents the pixel values at the end of the block.

The "run length" field of each tuple represents a number of successive pixels having the specified pixel value. For instance, if the entire 64-pixel raster scan line of a block has a single pixel value, the tuple may be of the form (64, pixel value). Generally, for reasons of space efficiency, either the run length value for each tuple will be limited to a particular maximum value, such as 32 or 64, or the run length values will be encoded using a fixed Huffman coding table. Longer runs of contiguous pixels all having the same pixel value may be encoded using more than one tuple. Using a fixed Huffman coding table is generally more space efficient than the alternatives. In an alternate embodiment, particularly useful for systems where the images used often have very long runs of contiguous pixels, the Huffman coding table includes an "escape" value to denote values greater than a particular maximum value. When a run length value starts with the escape value, a fixed number of bits following the escape value represents either the run length, or represents the difference between the run length and the largest value represented by a Huffman code other than the escape code.

Figure 12A:
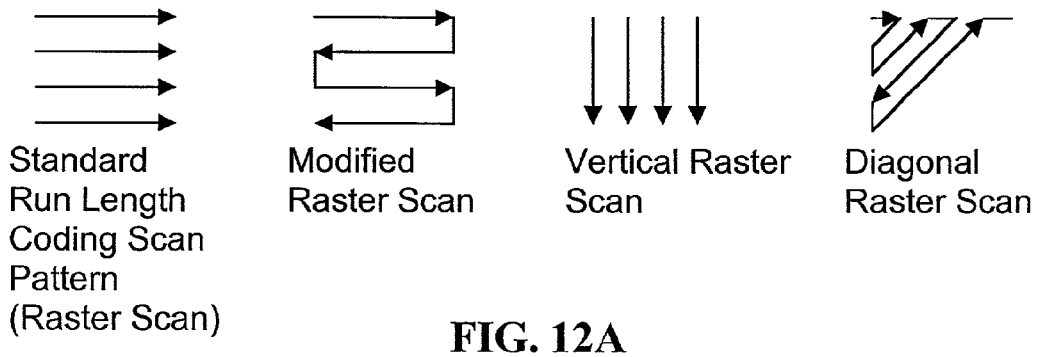
FIG. 12A depicts alternate scan patterns for use when run length encoding pixel values.

To minimize the coding length of each block, it may be advantageous to consider pixel orderings other than the conventional raster scan pixel ordering. In an alternate embodiment of the present invention, the run length coding procedure is divided into two or more procedures, each of which uses a different raster scan pixel ordering, as shown in FIG. 12A. In particular, in addition to the conventional raster scan pixel ordering, run length coding can be used with other pixel orderings, including a modified raster scan (moving left and right on alternating lines), a vertical raster scan, and a diagonal raster scan pattern. Referring back to FIG. 4, when the best coding type is determined for each block, the run length coding for each raster scan pattern is treated as a separate coding method. If R different run length coding methods are used, and one of the run length codings is determined to be the best for a particular block, then the selection at step 226 will indicate a particular one of the run length coding methods. In this alternate embodiment, when run length coding is used the block image file has a data structure, shown in FIG. 12B, that includes a sub-type identifier 370 to identify the scan pattern used.

In an alternate embodiment, Huffman coding of the remapped pixel values is not used. Instead each remapped pixel value is remapped to a value between 0 and DPV−1 and then encoded as a digital value using a number of bits equal to roundup($\log_2$(DPV)). Since the size of the color palette for each block, which is the number of distinct pixel values in the block, is typically much smaller than the full color palette for the entire image, this encoding is still often very efficient, even without the use of Huffman coding. Also, when using a shortened but fixed length encoding of the remapped pixel values, the pixel values do not need to be remapped in accordance with their frequency of use. Rather, each unique pixel value in the block can be mapped to any unique value in the range 0 to Max, where Max is equal to $2^R-1$ and R is equal to roundup($\log_2$(DPV)). For instance, each unique pixel value can be remapped into a any unique value ranging from 0 to DPV−1.

Pixel Remapping and Run Length Decoding Method

Figure 13:
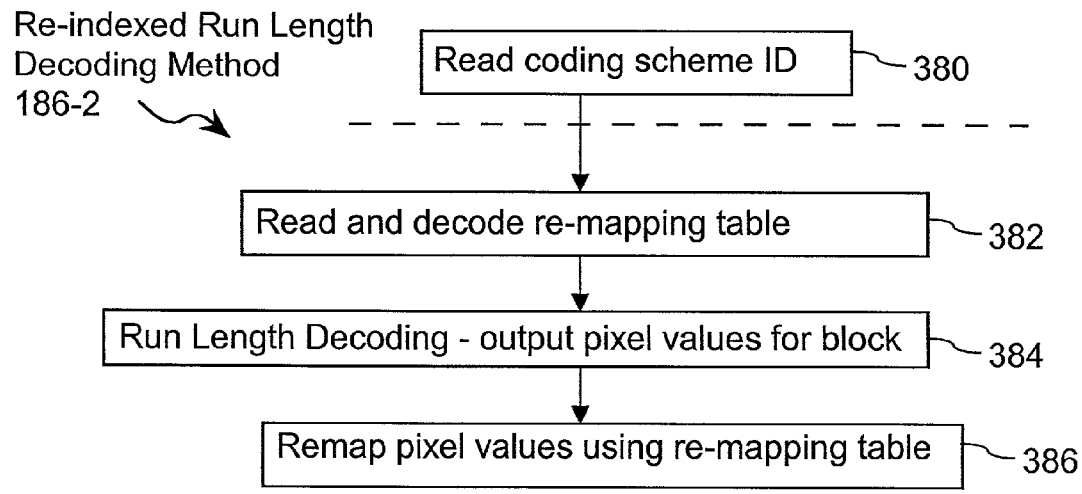
FIG. 13 is a flow chart of a procedure for decoding an image block that was encoded using the pixel value remapping and run length coding method depicted in FIG. 11.

Referring to FIG. 13, the run length decoding procedure 186-2 works, in general, by reading and interpreting the encoded data so as to reverse the process performed by the encoder procedure 174. The bits of the encoded data are read, in order, in a single pass from the first bit to the last. When the last data bit in the encoded data has been processed, and the decoded pixel values have been remapped into palette index values, reconstruction of the encoded block is complete.

Figure 12B:
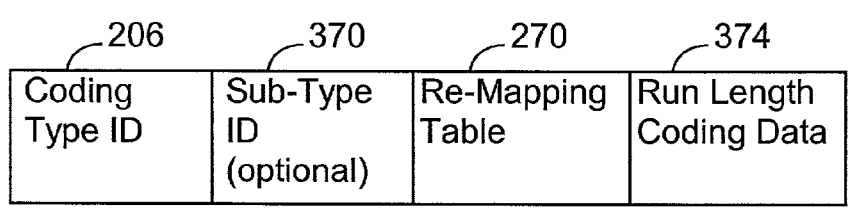
FIG. 12B depicts an image block data structure.

The coding type identifier is typically read (380) by a main decoder procedure, which then calls the remapping and run length decoder on the basis of the coding type identifier in the block image file. The remapping and run length decoder reads (inputs) and stores the remapping table 270 (FIG. 6C) stored in the block image file (382), and then decodes the run length data in the block image file and populates a block image array with the decoded values (384). More specifically, each successive (run length, pixel value) tuple in the block image file is read, and the specified pixel value is written into the next "run length" pixel positions of the block image array. The order of the pixels in the block image array depends on the scan pattern used by the encoding procedure that produced the block image file, which in turn is represented by either the coding type at the beginning of the file, or the coding type and a sub-type value, as shown in FIG. 12B. After the last tuple in the block image file has been decoded, the pixel values are remapped into palette index values (386) using the remapping table read in step 382.

Data Packing Encoding and Decoding Procedures

In a preferred embodiment, a third image data encoding procedure is called the data packing method. In this procedure the decoded image block is first remapped using the histogram method used in the remapping and NQS encoding procedure, as described above. As a result, a remapping table is generated, and each of the pixels is mapped to a value between 0 and DPV−1, where DPV is the number of distinct pixel values.

Next, each of the remapped pixel value is converted into a Huffman code, using a fixed Huffman coding table that is selected in accordance with the number of distinct pixel values in the image block. The resulting Huffman coded pixels are stored in the block image file, along with a coding type identifier and the remapping table. Because the number of distinct pixel values in many blocks is much smaller than the number of distinct pixel values in the full color palette used by the full image, this encoding is often quite small and efficient, although it is usually not as small either the NQS or run length encoded versions of the same block.

The decoding procedure for decoding a "remapped and data packed" block image file is as follows. The Huffman code for each pixel is decoded, using a fixed Huffman coding table selected in accordance with the number of entries in the remapping table. In addition, the decoded pixels are remapped in accordance with the remapping table. Thus, the decoding procedure is extremely simple.

The "remapped and data packed" block image file format is extremely efficient in terms of decoding time. In other words, the number of CPU cycles required to decode a "remapped and data packed" block image file is significantly less than for a "remapped and NQS encoded" block image file or even a "remapped and run length encoded" block image file. Thus, data packed block image files are particularly suitable for use with low CPU bandwidth client devices.

Pattern Based Encoding and Decoding Procedure

In a preferred embodiment, a fourth image data encoding procedure is called the pattern based encoding procedure or method. In this procedure the decoded image block is re-encoded using a pattern based encoding method, for instance the GIF or PNG encoding method. The block image decoding procedure used by the client device is the corresponding pattern based decoding procedure. The block image files generated in this way will be relatively large, which is not desirable. But in some embodiments it may be more important to use a conventional encoding than to use a bandwidth efficient encoding. For instance, if some client devices in a system are known to be able to decode only a small number of image formats, including the format of the original image file, then the blocks of the image may be encoded using multiple encoding methods (as described below with reference to FIG. 15), one of which is the encoding method of the original image file.

While this document describes a few block image coding methods that are believed to be particularly efficient, other block coding methods, including conventional data coding methods known to those skilled in the art, as well as new coding methods not yet developed, may be used in the system and method of the present invention.

Image Storage and Distribution Management

Figure 14:
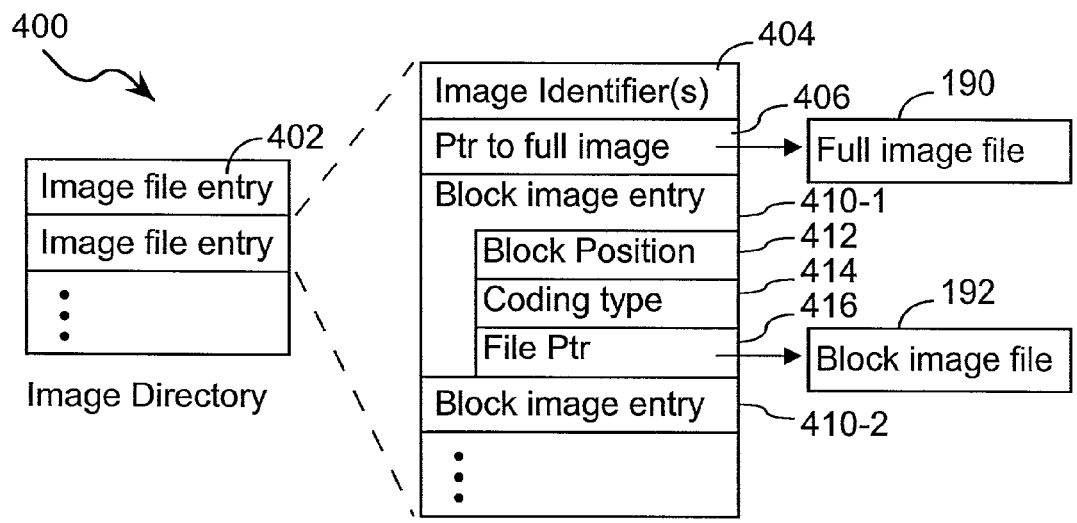
FIGS. 14 and 15 are block diagrams of an image directory for use by a server responding to requests for images from client devices.

Referring to FIG. 14, the server that distributes images to client devices may include an image directory 400 that facilitates distribution of full image files to high bandwidth client devices and distribution of the smaller block image files to low bandwidth client devices. In one embodiment, the image directory 400 includes an entry 402 for each image, such as a graphic image (e.g., a map). The entry 402 includes various image identifiers 404 to enable search tools to find the image entry, a pointer 406 to a full version of the image (e.g. a GIF or PNG file 190), and a set of block image entries 410 for each of the blocks of the image. Each block image entry 410 includes fields 412, 414 that identify the position and coding type of the block, and a pointer 416 to the corresponding block image file 192.

Figure 15:
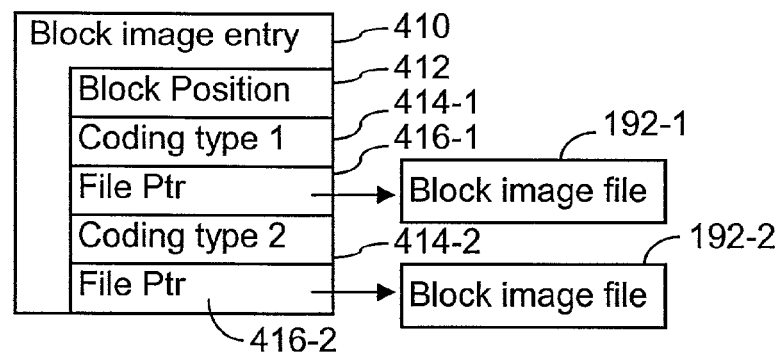

Referring to FIG. 15, in an alternate embodiment, where the server distributes files to a number of different types of low transmission bandwidth and/or low CPU bandwidth client devices, some image files may be re-encoded so as to include more than one version or encoding of one or more of the blocks in the image. For instance, one encoding of a block may be optimized for minimizing transmission time (e.g., minimum file length), while a second encoding of the block may be optimized for minimum decoding complexity. Alternately, the second encoding may be optimized for a weighted combination of file size and decoding complexity so as to minimize the time from a client device requesting the image to the time the image is displayed. For some blocks, a single encoding may be the best for both selection criteria, while for other blocks each selection criteria may have different best encodings. For those blocks that are encoded using more than one encoding method, the block image entry may include a separate coding type value 414 and file pointer 416 for each encoding of the block. In this embodiment, where some of the block image entries contain multiple pointers to multiple block image files, the server is configured to select the best block image file in accordance with the type of client device requesting the image. For instance, the server may be configured to preferentially send NQS coded block image files to a first type of client device (e.g., client devices having reasonably fast CPU's), and to preferentially send run length coded block image files to a second type of client devices (e.g., client devices having minimal data processing capabilities).

Alternate Method for Encoding Bit Depth Values

As explained above, in the NQS coding procedure a block larger than the minimum block size contains four subblocks. In an alternate embodiment, the MaxBit values for the four subblocks of the current block are represented by a MaxBit mask, followed by zero to three differentially encoded MaxBit values. The mask has four bits: $m_1$, $m_2$, $m_3$ and $m_4$, each of which is set equal to a predefined value (e.g., 1) only if the MaxBit of the corresponding subblock is equal to the MaxBit $m_0$ of the current (parent) block, and is otherwise set to zero. The mathematical representation of the mask is as follows:

$$\text{mask}=(m_0=m_1)+(m_0=m_2)+(m_0=m_3)+(m_0=m_4)$$

where the "+" (plus signs) in the above equation mean concatenation of the four mask bits.

For example, a mask of 1000 indicates that only subblock 1 has a MaxBit equal to the MaxBit of the current block. The value of the mask is always between 1 and 15.

The MaxBit mask is preferably encoded using a 15-symbol Huffman table (see Table 2 as an example). As can be seen, the four mask values that correspond to the most common mask patterns, where just one subblock has a MaxBit equal to the MaxBit of the parent block, are encoded with just three bits.

TABLE 2

Huffman Table for Encoding MaxBit Mask

| Mask | Huffman Code |
|---|---|
| 0001 | 111 |
| 0010 | 101 |
| 0011 | 1001 |
| 0100 | 011 |
| 0101 | 0010 |
| 0110 | 10000 |
| 0111 | 01001 |
| 1000 | 110 |
| 1001 | 01000 |
| 1010 | 0001 |
| 1011 | 00110 |
| 1100 | 0101 |
| 1101 | 00111 |
| 1110 | 0000 |
| 1111 | 10001 |

Encoding Subblock MaxBit Values

The MaxBit of each subblock whose MaxBit is equal to the MaxBit of the parent block does not need to be encoded, because its value is fully known from the MaxBit mask. Only the subblocks whose MaxBit is less than the MaxBit of the parent block have their MaxBit values differentially encoded. For instance, if the MaxBit values for the current block are $$m_1, m_2, m_3, m_4 = 5,0,3,2$$

then the only MaxBit values that need to be encoded are $m_2$, $m_3$ and $m_4$, because the MaxBit value of $m_1$ is known from the MaxBit mask and the previously stored and encoded value of the MaxBit $m_0$ of the current block.

It should be noted that if $m_0=1$, then there is no need to encode the MaxBit values of the subblocks, because those values are known completely from the MaxBit mask.

If $m_0 \neq 1$, then for each $m_i \neq m_0$, the procedure encodes the value $m_1$ as follows:

if $m_i=0$, then the procedure outputs a string of 0's of length $m_0-1$; and otherwise, the procedure outputs a string of 0's of length $m_0-m_i-1$ followed by a 1.

For instance, if $m_0=5$, and $m_1=0$, then $m_1$ is encoded as a string of four 0's: 0000. If $m_0=5$, and $m_2=3$, then $m_2$ is encoded as a string of (5−3−1=1) one 0 followed by a 1:01.

In our example of $\{m_1, m_2, m_3, m_4\}=\{5, 0, 3, 2\}$, the MaxBit values are encoded as follows:

| mask | $m_2$ Subblock | $m_3$ Subblock | $m_4$ Subblock |
|------|----------------|----------------|----------------|
| 111  | 0000           | 01             | 001            |

Client Device Image Management and Manipulation

Referring back to FIG. 1, block image files 192 downloaded into a client device 120 are decoded to form block images 138 that are stored in an image cache 137. The number of decoded block images 138 stored in the client device depends on the size of the image cache 137. Block images 138 are evicted from the image cache 137 (i.e., deleted) in accordance with a cache eviction policy as new block image files are downloaded and decoded. The cache eviction policy used in one embodiment is to evict the least recently used block image. The cache eviction policy used in another embodiment is a simple round robin eviction policy, which evicts the oldest block image in the cache that is not currently being displayed.

One use of the image cache 137 is to allow the client device to randomly access block images 138 for display. For instance, the simplest form of cache management would be to save in the cache the last image displayed prior to the current image. This enables the user of the client device to flip back and forth between two images without having to perform any additional downloads.

Another use of the image cache, similar to the one described above for allowing a user to flip back and forth between two images, is the generation of a slide show with video effect. In this embodiment, a set of two to two dozen block images are stored in the image cache, and then these block images are displayed in a predefined sequence at a predefined update rate, such as one update every 0.25 seconds, or one update every 0.5 seconds. The image sequence may be played once, or repeated a set number of times, or repeated in an infinite loop until any of a predefined set of events occurs. By displaying a sequence of block images in this way, a video-like effect is achieved. Because the present invention uses small block image files to facilitate fast downloading of images to client devices, the present invention makes it practical to generate video-like slide shows on low communication bandwidth client devices and even on low CPU bandwidth client devices.

Image Panning Using Client Device Image Cache

In a preferred embodiment, the image manipulation and transformation procedures 136 include an image panning procedure. The image panning procedure pans the image, in response to user commands, by composing an image from a set of block images and changing the portion of the composite image that is displayed to effect the panning. When the panning reaches an edge of the portion of the image available in the image cache 137, the panning procedure initiates the downloading of one or more block image files from the server to enable the image panning operation to continue. The downloaded block image files are decoded into block images, which are stored in the image cache 137. If the user is continuously panning in one particular direction, the panning procedure preferably includes instructions for implementing a look ahead capability, whereby it detects the need for the additional block image files before the panning reaches the edge of the portion of the image available in the image cache and requests the additional block image files before they are actually needed to continue the panning operation.

If the user switches panning directions, the panning procedure uses block image files available in the image cache to produce the needed portions of the image as it is panned, thereby avoiding duplicate downloading of images when the user pans back and forth within a portion of the image that can be maintained in the image cache.

Image Rotation by Rotating Individual Block Images

In a preferred embodiment, the image manipulation and transformation procedures 136 include an image rotating procedure. The image rotating procedure rotates the image, by −90° or +90° or 180°0 in response to user commands. This is accomplished by rotating individual block images, which requires only one image block as working memory as is occupied by the largest of the block files to be rotated. For instance, if the display of the client device is occupied by the four block images, each of the four block images is individually rotated, and then the rotated blocks are repositioned on the display (by rotating the blocks with respect to the display positions) so as to create a rotated image. Since rotating small block images takes very little working memory, and little in the way of CPU resources, client devices using the present invention can perform image rotations quickly and efficiently.

If the rotation of an image requires additional block image files to be downloaded, the additional block image files are requested and downloaded while the client device rotates the blocks are already present in its image cache.

Multi-Resolution Image Management with Zoom In and Zoom Out Support

Figure 16:
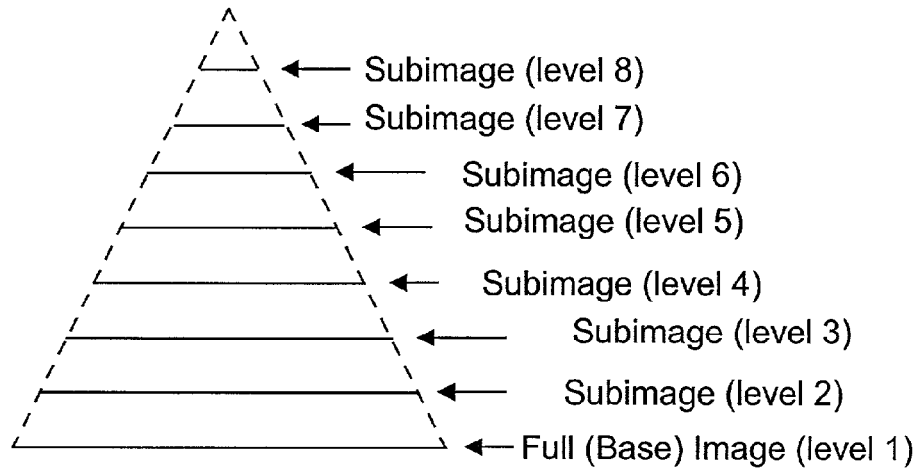
FIG. 16 is a conceptual representation of a set of image files that represent a particular image and multiple levels of resolution.

FIG. 16 is a conceptual representation of a set of image files that represent a particular image and multiple levels of resolution. When the image is a graphic image, each resolution level of the image is typically represented by a separate image file, and a separate set of block image files generated in accordance with the present invention. That is, each image file for a particular resolution level is divided into a set of blocks and those blocks are then encoded in accordance with the procedures and methodologies described above. A multiple resolution image will typically have two to six resolution levels, but any number of resolution levels is possible. For instance, if the image is a map of an entire country, and the highest resolution image shows individual street names and shows or identifies individual buildings, the image may have eight or more resolution levels.

Figure 17:
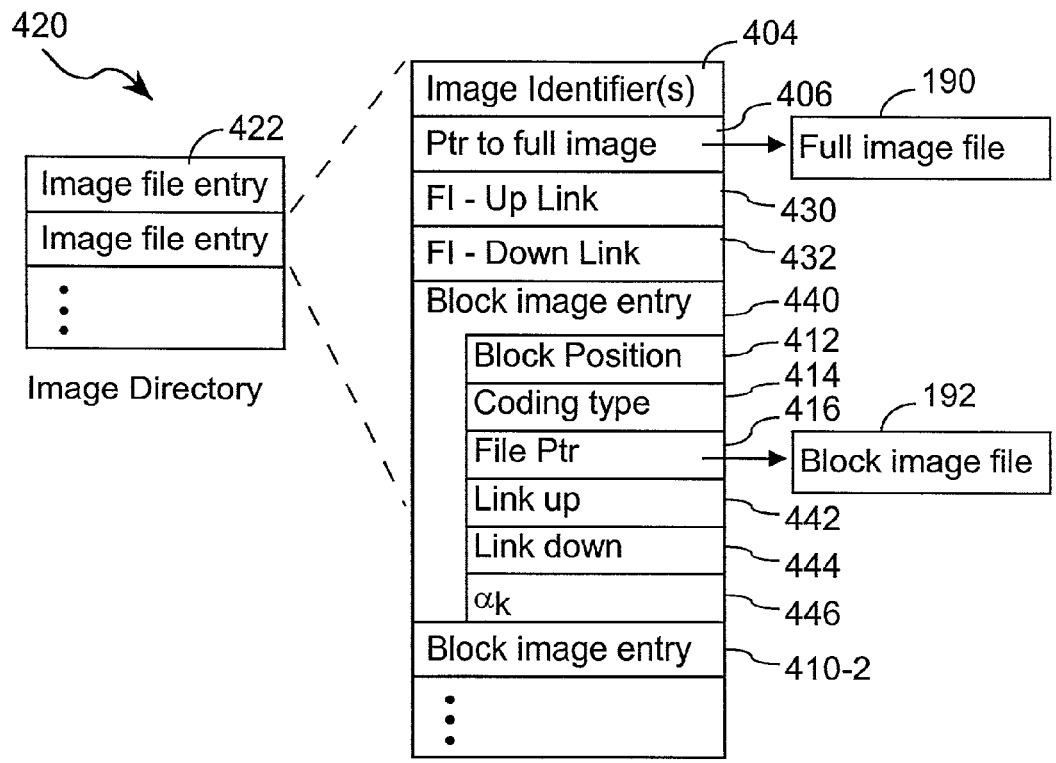
FIG. 17 depicts an image directory data structure for storing a directory entry for an image, the entry including pointers and links to block image files at multiple levels of resolution.

FIG. 17 depicts a image directory data structure 420 for storing directory entries for facilitating access to a set of images. The image directory data structure 420 may be used in either client devices and/or in server devices to store entries that facilitate access to images and blocks of those images at a plurality of resolution levels. The entry 422 for a particular image includes pointers and links to block image files at multiple levels of resolution. The following is a description of those portions of this entry data structure that were not described previously. With respect to the pointer 406 to the full image file, two links 430 and 432 have been added. In particular, a "full image—up link" 430 points to the image file, if any, at the next higher resolution level, while the "full image—down link" 432 points to the image file, if any, at the next lower resolution level. These two links 430, 432 facilitate zoom in and zoom out operations by full bandwidth client devices that are working with full image files.

The block image entry 440 for each block image file also contains additional information to facilitate multi-resolution image management. In particular, a link up 442 and a link down point to the block image files, if any, for the next higher and next lower resolution levels (for supporting zoom in and zoom out operations). The link up pointer 442 will typically point to the higher resolution block image file corresponding to the upper left quadrant of the block image represented by current block image file 192 (i.e., the file pointed to by file pointer 416). In the preferred embodiment, the image resolutions at any two neighboring image resolution levels are related by simple integer ratios, such as 4:1 (i.e., a 2× increase of resolution in each dimension).

The information in each block image entry 440 is preferably included in a header of each block image file that is downloaded to the client devices. By including the link up and link down values 442, 444 in the downloaded block image files, the process of zooming in and zooming out is greatly simplified.

When an application in a client device requests a zoom in or zoom out of the image currently being viewed, the client device first checks to see if the block images needed are already in its image cache. The block images not in the client device's image cache are requested using the link up pointer 442 when zooming in, and using the link down pointer 444 when zooming out.

Alternately, in those embodiments in which these links are not included in the block image file, the server, upon receiving the zoom in or zoom out request, looks up the block image entries of the current image based on their block positions and from there identifies the new block image files needed by using the link up or link down pointers. In yet other alternate embodiments, other methods may be used to quickly identify the higher or lower resolution block image files to be downloaded to the client device.

Combining Images using Alpha Blending

FIG. 18 is a conceptual representation for an image combining procedure herein called alpha blending, whereby graphic information in one image can be superimposed on a second image. In particular, two block images are combined by multiplying each color component of each pixel by a first factor, $1-\alpha_k$, for the first block image and by a second factor, $\alpha_k$, for the second block image and adding the resulting scaled color component values so as to generate a set of combined color component values for each pixel of a combined block image. A distinct alpha scaling factor $\alpha_k$ can be associated with each block image. In a preferred embodiment, alpha scaling factor $\alpha_k$ 446 (FIG. 17) of a block is stored in the block image entry 440 (FIG. 17) for the block image file in the image directory of the server. This information is included in the header of the block image file when it is downloaded to a client device, and thus is available if the downloaded block image file is alpha blended with another image.

In one client device application of the alpha blending feature of the present invention, the first image is a non-graphic image, such as a photograph, and the second image is a graphic image, re-encoded and stored in accordance with the present invention. The graphic image in this example is an "overlay" or "underlay" image that adds information to the non-graphic image. For instance, the non-graphic image may be a satellite photograph of a country or city or other site, and the graphic image may be a map that is scaled and designed to be superimposed on the photograph so as to identity various geographic and man-made features. More specifically, to generate an alpha blended combination of the photograph, the appropriate tiles of the photograph are downloaded to the client device and the corresponding block image files are also downloaded to the client device. For each tile of the photograph, a combined block image is generated by performing alpha blending, using an appropriate alpha value. The alpha value may be specified by the block image file, as described above. The alpha value may be different for different block images; for instance, some block images may have an alpha value of zero if those block images have no information to be superimposed on the photograph, while other block images will have non-zero alpha values. Further, some blocks of the combined image may come entirely from the graphic image, which is accomplished by setting alpha to a value of 1.0 for those blocks and thus canceling the contribution from the non-graphic image.

Alternately, the alpha value used may be specified by the client device's application program. For instance, the graphic image to be superimposed on a non-graphic image may be dynamically faded in and out by altering the alpha value in a series of timed steps. The procedure for performing such a fade in and fade out is shown in pseudocode form in FIGS. 19 and 20. As shown in FIG. 19, a fade in is accomplished by initialing the alpha value to a starting value, such as zero. The alpha value is then is incremented in a series of timed steps until it reaches a limit value, such as the alpha scaling factor $\alpha_k$ specified in the header of the block image file. At each step, the combined image is regenerated and displayed.

As shown in FIG. 20, a fade out is accomplished by initialing the alpha value to a starting value, such as the last alpha value used to generate the image currently shown on the client device's display, or the alpha scaling factor $\alpha_k$ specified in the header of the block image file. The alpha value is then is decremented in a series of timed steps until it reaches a limit value, such as zero. At each step, the combined image is regenerated and displayed.

The combined image generated at the client device using alpha blending may be panned and zoomed using the same techniques as those described earlier, except that as new graphic image blocks and non-graphic image tiles are downloaded, new combined blocks must be generated used alpha blending.

The alpha blending feature of the present invention can be also used with two graphic images, so as to superimpose one graphic image on another. However, most application of alpha blending are expected to be based on the combining of non-graphic images and graphic images.

A non-graphic image to be combined with a graphic image may also stored in a multi-resolution image format. See for instance, the description of a multi-resolution image storage and management system and method in U.S. patent application Ser. No. 09/687,467, filed Oct. 12, 2000, entitled Multi-resolution Image Data Management System And Method Based on Tiled Wavelet-like Transform and Sparse Data Coding, which is hereby incorporated by reference. In many implementations, the non-graphic image will be a JPEG encoded image, a wavelet or wavelet-like encoded image, or other type of "full color" image.

Combining Sound with Graphic Images and Alpha Blended Images

Figure 21:
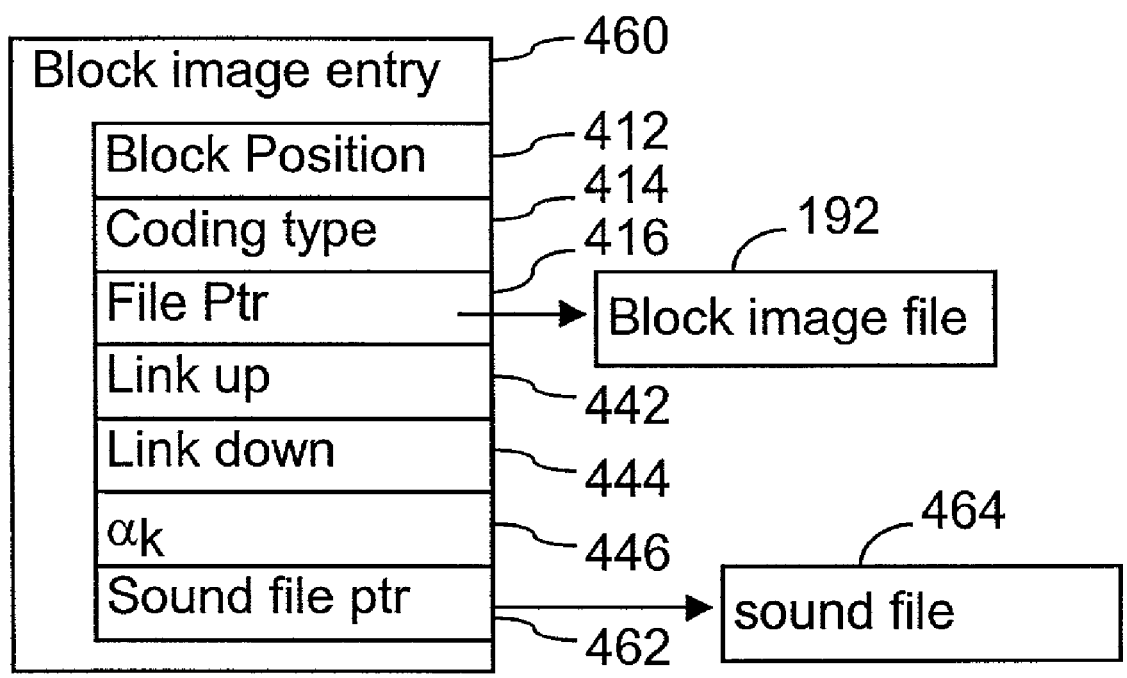
FIG. 21 depicts an image directory data structure for storing a directory entry for an image, the entry including a pointer to a sound file.

FIG. 21 depicts an image directory data structure for storing a directory entry 460 for an image. The entry 460 includes a pointer 462 to a sound file 464. When the directory entry for a block image file contains a non-null sound file pointer, the specified sound file is downloaded to the client device for playing as the image is displayed. For instance, the sound file may include instructions for driving to a particular location, or may contain the sound of a person reading a passage of a book or poem. In some instances, an application in the server will dynamically compose the sound file and add a pointer to it in the directory entry for a block image file prior to transmitting the block image file to the requesting client device. For instance, an automobile navigation application might dynamically compose driving instructions to a particular location, link the sound file containing the driving instructions to an image block, and then transmit the image block and the sound file to the requesting client device.

ALTERNATE EMBODIMENTS

Generally, the present invention is useful in any "memory conservative" context where the amount of working memory available is insufficient to process entire images as a single tile, or where a product must work in a variety of environments including low memory environments, or where an image may need to be conveyed over a low bandwidth communication channel or where it may be necessary or convenient to provide an image at a variety of resolution levels. The present invention is also very useful in networks that include low CPU bandwidth client devices, because it helps to substantially reduces the request to display delay time associated with downloading and displaying images by In alternate embodiments the image blocks could be processed in a different order. For instance, the image tiles could be processed from right to left instead of left to right. Similarly, image tiles could be processed starting at the bottom row and proceeding toward the top row.

The present invention can be implemented as a computer program product that includes a computer program mechanism embedded in a computer readable storage medium. For instance, the computer program product could contain the program modules shown in FIGS. 1 and 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of processing a graphic image, comprising:
dividing an image data array comprising the graphic image into blocks, wherein a majority of the blocks have a predefined fixed size; and
independently, losslessly encoding each of the blocks and storing each respective encoded block in a separate, respective file, wherein at least two encoded blocks of the graphic image are generated by different lossless encoding methods.

2. A method of processing a graphic image, comprising:
dividing an image data array comprising the graphic image into blocks, wherein a majority of the blocks have a predefined fixed size; and
generating a plurality of encoded blocks by independently processing each block of a plurality of the blocks to produce a corresponding encoded block by;
applying a plurality of distinct lossless encodings to the block to produce an equal plurality of distinct encoded block versions;
selecting as the encoded block one of the plurality of distinct encoded block versions in accordance with predefined selection criteria; and
storing each encoded block in a distinct file.

3. The method of claim 2, including storing in a header of each encoded block an encoding type identifier that identifies the encoding of the encoded block; and
transmitting to a device a subset of the encoded blocks in accordance with a request received from the device.

4. The method of claim 3, wherein the graphic image is stored in GIF format image file, and a first one of the plurality of distinct encodings includes remapping original pixel values in the block into remapped pixel values in accordance with a histogram mapping method and encoding the remapped pixel values using a nested quadratic splitting method.

5. The method of claim 4, wherein encoding the remapped pixel values using a nested quadratic splitting method includes encoding differential bit depth values using a Huffman coding table.

6. The method of claim 4, including storing in the header of each encoded block that is encoded using the first distinct encoding a remapping table that includes pixel value mapping information for mapping the remapped pixel values back to their respective original pixel values.

7. The method of claim 3, wherein at least a first one of the plurality of distinct encodings includes remapping original pixel values in the block into remapped pixel values in accordance with a histogram mapping method and storing in the header of each encoded block that is encoded using the first distinct encoding a remapping table that includes pixel value mapping information for mapping the remapped pixel values back to their respective original pixel values.

8. The method of claim 2, wherein the graphic image is stored in a GIF format image file, and a first one of the plurality of distinct encodings includes remapping pixel values in accordance with a histogram mapping method and encoding the remapped pixel values using run length coding method.

9. The method of claim 2, wherein a first one of the plurality of distinct encodings includes remapping pixel values in accordance with a histogram mapping method and encoding the remapped pixel values using an encoding method based on how many distinct pixel values are included in the block, such that the encoded remapped pixel values have a bit length determined by the number of distinct pixel values in the block.

10. The method of claim 2, wherein the graphic image is stored in a GIF format image file, and a first one of the plurality of distinct encodings is the GIF format, and at least one of the blocks is selected to be encoded in the GIF format.

11. The method of claim 2, wherein a first one of the plurality, of distinct encodings is a predefined GIF encoding format, at least one of the blocks is selected to be encoded in the GIF encoding format.

12. The method of claim 11, wherein at least one of the blocks is selected to be encoded in the GIF encoding format, and at least one of the blocks is selected to be encoded in another one of the plurality of distinct lossless encodings.

13. The method of claim 3, including
at the device, receiving and decoding each respective transmitted encoded block in accordance with the one of the plurality of distinct lossless encodings used to encode the encoded block; and
at the device, displaying at least a portion of the decoded blocks.

14. The method of claim 3, including
at the device, receiving and decoding each respective transmitted encoded block in accordance with the one of the plurality of distinct lossless encodings used to encode the encoded block; and
at the device, combining at least one of the decoded blocks with data representing a natural image to produce combined data representing a combined graphic and natural image, and then displaying at least a portion of the combined graphic and natural image.

15. The method of claim 3, including
at the device, receiving and decoding a transmitted encoded block in accordance with the one of the plurality of distinct lossless encodings used to encode the encoded block; and
at the device, displaying at least a portion of the decoded block.

16. The method of claim 3, including
at the device, receiving and decoding a transmitted encoded block in accordance with the one of the plurality of distinct lossless encodings used to encode the encoded block; and
at the device, combining the decoded block with data representing a natural image to produce combined data representing a combined graphic and natural image, and then displaying at least a portion of the combined graphic and natural image.

17. The method of claim 3, including
at the device, receiving and decoding each respective transmitted encoded block in accordance with the one of the plurality of distinct lossless encodings used to encode the encoded block; and
at the device, applying an image transformation function to at least one of the decoded blocks to produce transformed data representing a transformed image, and then displaying at least a portion of the transformed image.

18. The method of claim 2, further comprising: decoding the graphic image file to produce the image data array.

19. The method of claim 18, including storing in a header of each encoded block an encoding type identifier that identifies the encoding of the encoded block; and transmitting to a device a subset of the encoded blocks in accordance with a request received from the device.

20. The method of claim 19, wherein the graphic image is stored in GIF format image file, and a first one of the plurality of distinct encodings includes remapping original pixel values in the block into remapped pixel values in accordance with a histogram mapping method and encoding the remapped pixel values using a nested quadratic splitting method.

21. The method of claim 20, wherein encoding the remapped pixel values using a nested quadratic splitting method includes encoding differential bit depth values using a Huffman coding table.

22. The method of claim 20, including storing in the header of each encoded block that is encoded using the first distinct encoding a remapping table that includes pixel value mapping information for mapping the remapped pixel values back to their respective original pixel values.

23. The method of claim 19, wherein at least a first one of the plurality of distinct encodings includes remapping original pixel values in the block into remapped pixel values in accordance with a histogram mapping method and storing in the header of each encoded block that is encoded using the first distinct encoding a remapping table that includes pixel value mapping information for mapping the remapped pixel values back to their respective original pixel values.

24. The method of claim 18, wherein the graphic image is stored in a GIF format image file, and a first one of the plurality of distinct encodings includes remapping pixel values in accordance with a histogram mapping method and encoding the remapped pixel values using run length coding method.

25. The method of claim 18, wherein a first one of the plurality of distinct encodings includes remapping pixel values in accordance with a histogram mapping method and encoding the remapped pixel values using an encoding method based on how many distinct pixel values are included in the block, such that the encoded remapped pixel values have a bit length determined, at least in part, by the number of distinct pixel values in the block.

26. The method of claim 18, wherein the graphic image is stored in a GIF format image file, and a first one of the plurality of distinct encodings is the GIF format, and at least one of the blocks is selected to be encoded in the GIF format.

27. The method of claim 18, wherein a first one of the plurality of distinct encodings is a predefined GIF encoding format, at least one of the blocks is selected to be encoded in the GIF encoding format.

28. The method of claim 27, wherein at least one of the blocks is selected to be encoded in the GIF encoding format, and at least one of the blocks is selected to be encoded in another one of the plurality of distinct lossless encodings.

29. The method of claim 19, including
at the device, receiving and decoding each respective transmitted encoded block in accordance with the one of the plurality of distinct lossless encodings used to encode the encoded block; and
at the device, displaying at least a portion of the decoded blocks.

30. The method of claim 19, including
at the device, receiving and decoding each respective transmitted encoded block in accordance with the one of the plurality of distinct lossless encodings used to encode the encoded block; and
at the device, combining at least one of the decoded blocks with data representing a natural image to produce combined data representing a combined graphic and natural image, and then displaying at least a portion of the combined graphic and natural image.

31. The method of claim 19, including
at the device, receiving and decoding a transmitted encoded block in accordance with the one of the plurality of distinct lossless encodings used to encode the encoded block; and
at the device, displaying at least a portion of the decoded block.

32. The method of claim 19, including
at the device, receiving and decoding a transmitted encoded block in accordance with the one of the plurality of distinct lossless encodings used to encode the encoded block; and
at the device, combining the decoded block with data representing a natural image to produce combined data representing a combined graphic and natural image, and then displaying at least a portion of the combined graphic and natural image.

33. The method of claim 19, including
at the device, receiving and decoding each respective transmitted encoded block in accordance with the one of the plurality of distinct lossless encodings used to encode the encoded block; and
at the device, applying an image transformation function to at least one of the decoded blocks to produce transformed data representing a transformed image, and then displaying at least a portion of the transformed image.

34. The method of claim 1, further comprising:
prior to said dividing, decoding an image file, encoded using a first predefined run length or pattern based encoding method, to produce the image data array;
wherein the encoding of each respective block uses a respective encoding method that is distinct from the first predefined encoding method.

35. A computer program product for use in conjunction with a computer system, the computer program product comprising a computer readable storage medium and a computer program mechanism embedded therein, the computer program mechanism comprising:
an encoding module for dividing a graphic image comprising an image data array into blocks, wherein a majority of the blocks have a predefined fixed size and for encoding at least a plurality of the blocks, the encoding module including instructions for independently processing each block of a plurality of the blocks to produce a corresponding encoded block by:
applying a plurality of distinct lossless encodings to the block to produce an equal plurality of distinct encoded block versions;
selecting as the encoded block one of the plurality of distinct encoded block versions in accordance with predefined selection criteria; and
storing each encoded block in a distinct file.

36. The computer program product of claim 35, wherein the encoding module includes instructions for storing in a header of each encoded block an encoding type identifier that identifies the encoding of the encoded block.

37. The computer program product of claim 36, wherein the image file is a GIF format image file, and a first one of the plurality of distinct encodings includes remapping original pixel values in the block into remapped pixel values in accordance with a histogram mapping method and encoding the remapped pixel values using a nested quadratic splitting method.

38. The computer program product of claim 37, wherein encoding module includes instructions for encoding the remapped pixel values using a nested quadratic splitting method that include encoding differential bit depth values using a Huffman coding table.

39. The computer program product of claim 37, wherein the encoding module includes instructions for storing in the header of each encoded block that is encoded using the first distinct encoding a remapping table that includes pixel value mapping information for mapping the remapped pixel values back to their respective original pixel values.

40. The computer program product of claim 36, wherein at least a first one of the plurality of distinct encodings includes remapping original pixel values in the block into remapped pixel values in accordance with a histogram mapping method and storing in the header of each encoded block that is encoded using the first distinct encoding a remapping table that includes pixel value mapping information for mapping the remapped pixel values back to their respective original pixel values.

41. The computer program product of claim 35, wherein the graphic image is a GIF format image file, and a first one of the plurality of distinct encodings includes remapping pixel values in accordance with a histogram mapping method and encoding the remapped pixel values using run length coding method.

42. The computer program product of claim 35, wherein a first one of the plurality of distinct encodings includes remapping pixel values in accordance with a histogram mapping method and encoding the remapped pixel values using an encoding method based on how many distinct pixel values are included in the block, such that the encoded remapped pixel values have a bit length determined by the number of distinct pixel values in the block.

43. The computer program product of claim 35, including
a server module for transmitting to a client device a subset of the encoded blocks in accordance with a request received from the client device; and
a client module, for use in the client device, for receiving and decoding each respective transmitted encoded block in accordance with the one of the plurality of distinct lossless encodings used to encode the encoded block.

44. The computer program product of claim 35, including
a server module for transmitting to a client device a subset of the encoded blocks in accordance with a request received from the client device; and
a client module, for use in the client device, for receiving and decoding each respective transmitted encoded block in accordance with the one of the plurality of distinct lossless encodings used to encode the encoded block; and
at the device, combining at least one of the decoded blocks with data representing a natural image to produce combined data representing a combined graphic and natural image, and then displaying at least a portion of the combined graphic and natural image.

45. The computer program product of claim 35, including
a server module for transmitting to a client device an encoded block of the plurality of the encoded blocks'
a client module, for use in the client device, for receiving and decoding the transmitted encoded block in accordance with the one of the plurality of distinct lossless encodings used to encode the encoded block.

46. The computer program product of claim 35, including
a server module for transmitting to a client device an encoded block of the plurality of the encoded blocks;

a client module, for use in the client device, for receiving and decoding the transmitted encoded block in accordance with the one of the plurality of distinct lossless encodings used to encode the encoded block; and for combining the decoded block with data representing a natural image to produce combined data representing a combined graphic and natural image.

47. The computer program product of claim 35, including
a server module for transmitting to a client device a subset of the encoded blocks in accordance with a request received from the client device; and
a client module, for use in the client device, for receiving and decoding each respective transmitted encoded block in accordance with the one of the plurality of distinct lossless encodings used to encode the encoded block; and for applying an image transformation function to at least one of the decoded blocks to produce transformed data representing a transformed image, and then displaying at least a portion of the transformed image.

48. The computer program product of claim 35, the computer program mechanism further comprising:
instructions for decoding a graphic image file to produce the image data array; the graphic image file having previously been encoded using a first predefined run-length based or pattern based encoding method, the graphic image file representing a graphic image.

49. The computer program product of claim 48, the encoding module including instructions for storing in a header of each encoded block an encoding type identifier that identifies the encoding of the encoded block.

50. The computer program product of claim 49, wherein the graphic image is stored in GIF format image file, and a first one of the plurality of distinct encodings includes remapping original pixel values in the block into remapped pixel values in accordance with a histogram mapping method and encoding the remapped pixel values using a nested quadratic splitting method.

51. The computer program product of claim 50, wherein encoding the remapped pixel values using a nested quadratic splitting method includes encoding differential bit depth values using a Huffman coding table.

52. The computer program product of claim 50, wherein the encoding module includes instructions for storing in the header of each encoded block that is encoded using the first distinct encoding a remapping table that includes pixel value mapping information for mapping the remapped pixel values back to their respective original pixel values.

53. The computer program product of claim 49, wherein at least a first one of the plurality of distinct encodings includes remapping original pixel values in the block into remapped pixel values in accordance with a histogram mapping method and storing in the header of each encoded block that is encoded using the first distinct encoding a remapping table that includes pixel value mapping information for mapping the remapped pixel values back to their respective original pixel values.

54. The computer program product of claim 48, wherein the graphic image is stored in a GIF format image file, and a first one of the plurality of distinct encodings includes remapping pixel values in accordance with a histogram mapping method and encoding the remapped pixel values using run length coding method.

55. The computer program product of claim 48, wherein a first one of the plurality of distinct encodings includes remapping pixel values in accordance with a histogram mapping method and encoding the remapped pixel values using an encoding method based on how many distinct pixel values are included in the block, such that the encoded remapped pixel values have a bit length determined, at least in part, by the number of distinct pixel values in the block.

56. The computer program product of claim 48, wherein the graphic image is stored in a GIF format image file, and a first one of the plurality of distinct encodings is the GIF format, and at least one of the blocks is selected to be encoded in the GIF format.

57. The computer program product of claim 48, wherein a first one of the plurality of distinct encodings is a predefined GIF encoding format, at least one of the blocks is selected to be encoded in the GIF encoding format.

58. The computer program product of claim 57, wherein at least one of the blocks is selected to be encoded in the GIF encoding format, and at least one of the blocks is selected to be encoded in another one of the plurality of distinct lossless encodings.

59. The computer program product of claim 48, including
a server module for transmitting to a client device a subset of the encoded blocks in accordance with a request received from the client device; and
a client module, for use in the client device, for receiving and decoding each respective transmitted encoded block in accordance with the one of the plurality of distinct lossless encodings used to encode the encoded block.

60. The computer program product of claim 48, including
a server module for transmitting to a client device a subset of the encoded blocks in accordance with a request received from the client device; and
a client module, for use in the client device, for receiving and decoding each respective transmitted encoded block in accordance with the one of the plurality of distinct lossless encodings used to encode the encoded block, for combining at least one of the decoded blocks with data representing a natural image to produce combined data representing a combined graphic and natural image, and then displaying at least a portion of the combined graphic and natural image.

61. The computer program product of claim 48, including
a server module for transmitting to a client device a subset of the encoded blocks in accordance with a request received from the client device; and
a client module, for use in the client device, for receiving and decoding the transmitted encoded block in accordance with the one of the plurality of distinct lossless encodings used to encode the encoded block.

62. The computer program product of claim 48, including
a server module for transmitting to a client device an encoded block of the plurality of encoded blocks;
a client module, for use in the client device, for receiving and decoding the transmitted encoded block in accordance with the one of the plurality of distinct lossless encodings used to encode the encoded block, and for combining the decoded block with data representing a natural image to produce combined data representing a combined graphic and natural image, and then displaying at least a portion of the combined graphic and natural image.

63. The computer program product of claim 48, including
a server module for transmitting to a client device a plurality of the encoded blocks;
a client module, for use in the client device, receiving and decoding each respective transmitted encoded block in accordance with the one of the plurality of distinct lossless encodings used to encode the encoded block, and for applying an image transformation function to at least one of the decoded blocks to produce transformed data representing a transformed image, and then displaying at least a portion of the transformed image.

64. The computer program product of claim 48, wherein each of the plurality of distinct lossless encodings is distinct from the first predefined encoding method.

65. A method of distributing a graphic image, comprising:
storing an image, including storing a plurality of losslessly encoded blocks in separate files, each losslessly encoded block corresponding to a distinct portion of the image, wherein two losslessly encoded blocks of the image are encoded using different losslessly encoding methods; and
transmitting to a device a subset of the losslessly encoded blocks in accordance with a request received from the device.

66. The method of claim 65, including
dividing the image into blocks, wherein a majority of the blocks have a predefined fixed size; and
generating the plurality of encoded blocks by independently processing each block of a plurality of the blocks to produce a corresponding encoded block by:
applying a plurality of distinct lossless encodings to the block to produce an equal plurality of distinct encoded block versions;
selecting as the encoded block one of the plurality of distinct encoded block versions in accordance with predefined selection criteria; and
storing the encoded blocks as distinct files.

67. A computer program product for use in conjunction with a computer system, the computer program product comprising a computer readable storage medium and a computer program mechanism embedded therein, the computer program mechanism comprising:
a storing module for storing a plurality of losslessly encoded blocks in separate files, each losslessly encoded block corresponding to a distinct portion of an image, wherein two losslessly encoded blocks of the image are encoded using different losslessly encoding methods; and
a server module for transmitting to a client device a subset of the losslessly encoded blocks in accordance with a request received from the client device.

68. The computer program product of claim 67, including:
an encoding module for dividing the image into image blocks, wherein a majority of the image blocks have a predefined fixed size and for generating the plurality of encoded blocks, the encoding module including instructions for independently processing each image block of a plurality of the image blocks to produce a corresponding encoded block by:
applying a plurality of distinct lossless encodings to the image block to produce an equal plurality of distinct encoded block versions;
selecting as the encoded block one of the plurality of distinct encoded block versions in accordance with predefined selection criteria; and
storing each encoded block in a distinct file.

69. The method of claim 1, wherein a plurality of distinct lossless encodings are applied to each block to produce an equal plurality of distinct encoded block versions, and one of the plurality of distinct encoded versions is selected as the encoded block in accordance with predefined selection criteria.

70. The method of claim 65, wherein a plurality of distinct lossless encodings are applied to each block to produce an equal plurality of distinct encoded block versions, and one of the plurality of distinct encoded versions is selected as the encoded block in accordance with predefined selection criteria.

71. The computer program product of claim 67, including one or more modules for applying a plurality of distinct lossless encodings to each block to produce an equal plurality of distinct encoded block versions, and for selecting one of the plurality of distinct encoded versions as the encoded block in accordance with predefined selection criteria.

* * * * *